(12) United States Patent
Wade et al.

(10) Patent No.: US 11,084,707 B2
(45) Date of Patent: Aug. 10, 2021

(54) APPARATUS FOR CONTROLLING FLOW OF BEVERAGE

(71) Applicant: ValidFill LLC, Bradenton, FL (US)

(72) Inventors: Jeremy Wade, Bradenton, FL (US); Loren Ostema, Sarasota, FL (US); James Wampler, Bradenton, FL (US); Frank Uellenberg, North Port, FL (US); Paul Wade, Bradenton, FL (US); Peter Dorney, Geneva, FL (US); Alex Whiteaker, Bradenton, FL (US)

(73) Assignee: ValidFill LLC, Bradenton, FL (US)

( * ) Notice: Subject to any disclaimer, the term of this patent is extended or adjusted under 35 U.S.C. 154(b) by 0 days.

(21) Appl. No.: 16/778,752

(22) Filed: Jan. 31, 2020

(65) Prior Publication Data

US 2020/0247662 A1 Aug. 6, 2020

Related U.S. Application Data

(60) Provisional application No. 02/042,019.

(51) Int. Cl.
*B67D 1/08* (2006.01)
*B67D 1/14* (2006.01)
*G07F 13/02* (2006.01)
*G06Q 20/14* (2012.01)
*B67D 1/12* (2006.01)

(52) U.S. Cl.
CPC ......... *B67D 1/1477* (2013.01); *B67D 1/0877* (2013.01); *B67D 1/0888* (2013.01); *B67D 1/0882* (2013.01); *B67D 1/0894* (2013.01); *B67D 1/124* (2013.01); *B67D 1/1405* (2013.01); *B67D 2001/1483* (2013.01); *B67D 2210/00065* (2013.01); *B67D 2210/00083* (2013.01);

(Continued)

(58) Field of Classification Search
CPC .. B67D 1/1477; B67D 1/0877; B67D 1/0888; B67D 2001/1483; B67D 1/124; B67D 1/0882; B67D 1/1405; B67D 1/0894; B67D 2210/00083; B67D 2210/00089; B67D 2210/00065; G06Q 30/00; G06Q 20/145; A47J 31/407; G07F 13/025
See application file for complete search history.

(56) References Cited

U.S. PATENT DOCUMENTS 4,111,243 A * 9/1978 Fetterman ............ B67D 1/1234
141/102
4,979,641 A * 12/1990 Turner ................. B67D 1/0855
222/153.03

(Continued)

FOREIGN PATENT DOCUMENTS

CA 1277303 12/1990

*Primary Examiner* — Frederick C Nicolas
(74) *Attorney, Agent, or Firm* — Buchanan Ingersoll & Rooney PC

(57) ABSTRACT

Disclosed are embodiments of a beverage dispensing system that controls the flow of beverage based on information acquisitioned from a marker associated with a vessel for the beverage. The system utilizes a switching apparatus located in the tap of the dispensing unit that can selectively enable mechanical connection between the hand lever of the tap and the stem based on the information acquisitioned. Some embodiments include a hand tilt device for automatically controlling the flow of beverage, and a vessel tilt device to adjusting the tilt of the vessel so as to achieve a preferred pour.

23 Claims, 18 Drawing Sheets

(52) U.S. Cl.
    CPC . *B67D 2210/00089* (2013.01); *G06Q 20/145* (2013.01); *G07F 13/025* (2013.01)

(56) References Cited

U.S. PATENT DOCUMENTS

| | | | |
|---|---|---|---|
| 4,997,012 A | | 3/1991 | Kuziw |
| 5,022,557 A | * | 6/1991 | Turner ................. B67D 1/0855 222/54 |
| 5,363,989 A | | 11/1994 | Zeamer et al. |
| 5,431,302 A | | 7/1995 | Tulley et al. |
| 5,454,406 A | * | 10/1995 | Rejret .................. B67D 1/1213 137/624.12 |
| 5,607,084 A | * | 3/1997 | George ................ B67D 1/1466 137/383 |
| 5,750,905 A | * | 5/1998 | Weimer .................. B67D 1/08 222/14 |
| 6,398,084 B2 | * | 6/2002 | Maruyama ............... B67D 1/14 222/504 |
| 7,373,784 B2 | | 5/2008 | Haskayne |
| 7,753,231 B2 | * | 7/2010 | Giles .................... B67D 1/0888 222/14 |
| 8,245,739 B1 | * | 8/2012 | Wade ..................... G07F 9/026 141/94 |
| 2011/0298583 A1 | | 12/2011 | Libby et al. |

* cited by examiner

APPARATUS FOR CONTROLLING FLOW OF BEVERAGE

CROSS-REFERENCE TO RELATED APPLICATIONS

This application is related to and claims the benefit of U.S. 62/800,834, filed Feb. 4, 2019, the entire contents of which is incorporated herein by reference.

FIELD OF THE INVENTION

Embodiments relate to a beverage dispensing system that controls the flow of beverage based on information acquisitioned from a marker associated with a vessel for the beverage. The system utilizes a switching apparatus located in the tap of the dispensing unit that can selectively enable mechanical connection between the hand lever and the stem of the tap based on the information acquisitioned.

BACKGROUND OF THE INVENTION

Known apparatuses for controlling flow of beverage can be appreciated from U.S. Pat. Nos. 4,997,012, 5,431,302, 5,363,989, 7,373,784, U.S. 2011/0298583, and CA 1277303. Conventional systems can be limited in versatility and functionality.

SUMMARY OF THE INVENTION

Disclosed are embodiments of a beverage dispensing system that controls the flow of beverage based on information acquisitioned from a marker associated with a vessel for the beverage. The system utilizes a switching apparatus located in the tap of the dispensing unit that can selectively enable mechanical connection between the hand lever and the stem of the tap based on the information acquisitioned. Some embodiments include a hand tilt device for automatically controlling the flow of beverage, and a vessel tilt device to adjusting the tilt of the vessel so as to achieve a preferred pour.

In one embodiment, a switching apparatus can include a magnetic field generator. The switching apparatus can include a slide having a top surface and a bottom surface. The slide can have a slide tack formed in or on the bottom surface. The slide can have a first opening formed in the top surface and a second opening formed in the bottom surface. The first opening and the second opening can subtend each other so as to form a longitudinal axis. The switching apparatus can include a rod configured to slide along the slide track. The rod can be further configured to move perpendicularly to the slide track when the rod is slid to be positioned at the longitudinal axis. The rod can be made from magnetic material. The rod being positioned at the longitudinal axis forms an alignment position. The rod not being positioned at the longitudinal axis forms a mis-alignment position. The switching apparatus can include a spring element configured to bias the rod to the mis-alignment position. The magnetic field generator can be configured to generate a magnetic field to cause the rod to slide towards the alignment position. In the alignment position, the rod serves as a cantilever to facilitate mechanical engagement and transfer of motion between a first ancillary element configured to insert through the first opening and a second ancillary element configured to insert through the second opening. In the mis-alignment position, the first ancillary element does not mechanically engage the second ancillary element.

Some embodiments of the switching apparatus can include a control module configured to at least one of: supply electrical power to operate the magnetic field generator; and transmit control signals to control operation of the magnetic field generator.

Some embodiments of the switching apparatus can include a rechargeable battery unit.

In one embodiment, a tap head can include a hollow member having a tap head housing first end, a tap head housing second end, a tap head housing third end, and a tap head housing fourth end. The tap head housing first end can subtend the tap head housing second end so as to form a tap head longitudinal axis running from the tap head housing first end to the tap head housing second end. The tap head housing third end can subtend the tap head housing fourth end so as to form a tap head latitudinal axis running from the tap head housing third end to the tap head housing fourth end. The tap head housing first end can have a hand lever aperture configured to receive a portion of a hand lever. The tap head housing second end can have a stem aperture configured to receive a portion of a stem. The tap head housing can have a magnetic field generator located at or near the tap head housing fourth end. The tap head housing can have a slide located at or near the tap head housing third end. The slide can have a top surface and a bottom surface. The slide can have a slide track formed in or on the bottom surface, the slide track being along the tap head latitudinal axis. The slide can have a first opening formed in the top surface and a second opening formed in the bottom surface, the first opening being in-line with the hand lever aperture and the second opening being in-line with the stem aperture. The tap head housing can have a rod configured to slide along the slide track. The rod can be further configured to move along the tap head longitudinal axis when the rod is slid to be aligned with the hand lever aperture and the stem aperture. The rod can be made from magnetic material. The rod being aligned with the hand lever aperture and the stem aperture forms an alignment position. The rod not being aligned with the hand lever aperture and the stem aperture forms a mis-alignment position. A spring element can be provided and be configured to bias the rod to the mis-alignment position. The magnetic field generator is configured to generate a magnetic field to cause the rod to slide towards the alignment position. In the alignment position, the rod serves as a cantilever to facilitate mechanical engagement and transfer of motion between the hand lever and the stem. In the mis-alignment position, the hand lever does not mechanically engage the stem.

In some embodiments, the tap head is configured to removably connect to a tap dispenser, the tap dispenser comprising the stem.

In at least one embodiment, a tap can include a tap dispenser, comprising: connection lines to facilitate fluid connection from a beverage container to a port of a dispensing unit; and a stem configured to facilitate actuation of a disc for selective obstruction of the port; and an embodiment of the tap head disclosed herein.

Some embodiments of the tap head can include a control module configured to at least one of: supply electrical power to operate the magnetic field generator; and transmit control signals to control operation of the magnetic field generator.

In at least one embodiment, a beverage dispensing system can include a dispensing unit comprising a tap dispenser, the dispensing unit configured to disburse beverage from a beverage container via operation of the tap dispenser. The tap dispenser can include: connection lines to facilitate fluid connection from the beverage container to a port of the dispensing unit; and a stem configured to facilitate actuation of a disc for selective obstruction of the port. The system can include a tap head configured to attach to the tap dispenser and receive a portion of the stem and receive a portion of the hand lever. The tap head can have a switching apparatus configured to cause a rod to facilitate mechanical engagement and transfer of motion between the hand lever and the stem when the switching apparatus is activated. When the switching apparatus is activated, actuation of the hand lever acts upon the stem. When the switching apparatus is not activated, actuation of the hand lever does not act upon the stem.

Some embodiments of the system can include a control module configured to at least one of: supply electrical power to operate the switch; and transmit control signals to control operation of the switch.

Some embodiments of the system can include a reader configured to acquisition marker information from a marker.

Some embodiments of the system can include the marker, the marker being associated with a vessel.

In some embodiments, the marker information includes personal ID information, account use information, and/or vessel information.

Some embodiments of the system can include a hand lever tilt device configured to automatically actuate the hand lever.

Some embodiments of the system can include a vessel tilt device configured to support and tilt a vessel into which beverage is being disbursed from the port.

Some embodiments of the system can include a display configured to display at least some of the marker information.

In some embodiments, the display is configured to display instructional information, tutorial information, advertising content, and/or marketing content.

Some embodiments of the system can include an identification monitoring module configured to scan for, acquisition, and/or receive information to confirm the identity of a user.

Some embodiments of the system can include: a control module configured to supply electrical power to operate the switch and/or transmit control signals to control operation of the switch; a marker associated with a vessel, the marker being encoded with marker information comprising personal ID information, account use information, and/or vessel information; a reader configured to acquisition marker information from the marker; a hand lever tilt device configured to automatically actuate the hand lever; a vessel tilt device configured to support and tilt the vessel into which beverage is being disbursed from the port; a display configured to display at least some of the marker information, instructional information, tutorial information, advertising content, and/or marketing content; an identification monitoring module configured to scan for, acquisition, and/or receive information to confirm the identity of a user; and a computer device configured to establish a communications network.

In some embodiments, the system is configured to adjust operating parameters of beverage flow rate, amount of beverage disbursed, and tilt of the vessel.

In some embodiments, the system is configured to adjust the operating parameters to achieve a preferred pour, the preferred pour being a beverage flow rate, a beverage amount, and a vessel tilt that maximizes the fluid dynamics of the disbursement to generate a desired taste.

In one embodiment, a tap includes a tap dispenser including connection lines to facilitate fluid connection from a beverage container to a port of a dispensing unit; and a stem configured to facilitate actuation of a disc for selective obstruction of the port. The tap can include a tap head including: a push-button configured to activate a gear assembly, the gear assembly in mechanical connection with the stem; a switch configured to selectively make an electrical connection facilitating activation of the gear assembly when the push-button is activated. The switch can be configured to make the electrical connection based on marker information transmitted to the switch from a reader.

In one embodiment, the beverage dispensing system can include a control module configured to supply electrical power to operate the switch and/or transmit control signals to control operation of the switch. The system can further include a marker associated with a vessel, the marker being encoded with marker information comprising personal ID information, account use information, and/or vessel information. The system can further include a reader configured to acquisition marker information from the marker. The system can further include a hand lever tilt device configured to automatically actuate the hand lever. The system can further include a vessel tilt device configured to support and tilt the vessel into which beverage is being disbursed from the port, wherein the vessel tilt device includes an activation device and an angle sensor. The system can further include a display configured to display at least some of the marker information, instructional information, tutorial information, advertising content, and/or marketing content. The system can further include an identification monitoring module configured to scan for, acquisition, and/or receive information to confirm the identity of a user. The system can further include a pressure sensor, a flow meter sensor, and/or a temperature sensor. The system can further include an input/output controller configured to coordinate command and control of the vessel tilt device, the activation device, the display, the switch, and the control module, as well as data acquisitioning from the angle sensor, the pressure sensor, the flow meter sensor, and/or the temperature sensor.

In one embodiment, the beverage dispensing system can include a plurality of dispensing units. The system can have a master control box configured to control one or more dispensing units.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
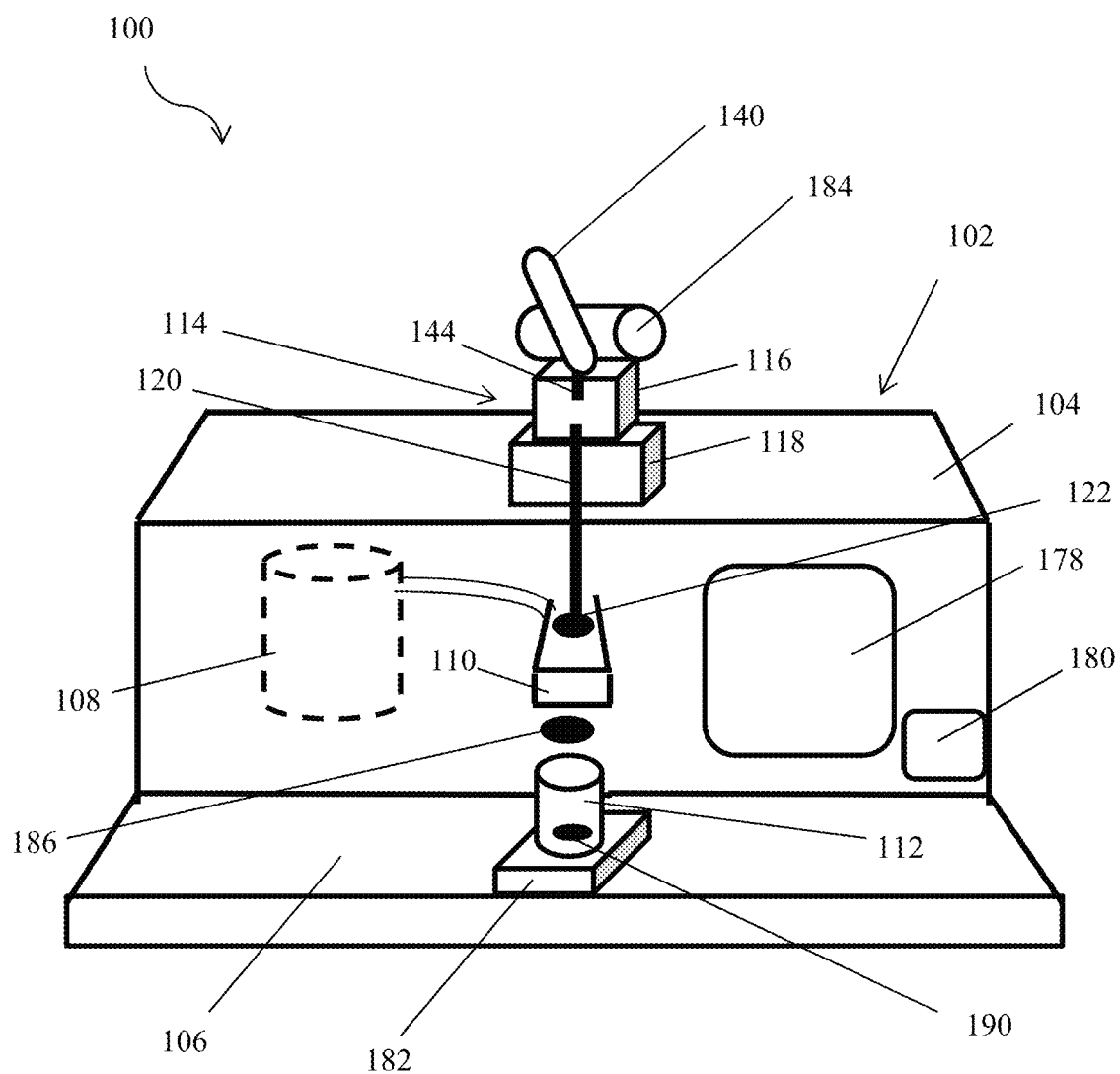
FIG. 1 shows an embodiment of the beverage dispensing system.

Referring to FIG. 1, embodiments can include a beverage dispensing system 100 configured for controlling flow of beverage. The beverage dispensing system 100 can be an electro-mechanical system having dispensing nozzles, dispensing heads, dispensing taps, etc. to dispense beverage in an automated or semi-automated fashion. The beverage to be dispensed can be water, juice, carbonated beverage, beer, wine, pre-mixed drinks (alcoholic or non-alcoholic), etc. The beverage dispensing system 100 includes, or can be configured to be used with, a dispensing unit 102 having a housing 104 with a beverage tray 106, a beverage container or reservoir 108, hoses, pumps, ports 110 etc. to facilitate flow of beverage from the beverage container 108, through a port 110, and to a vessel 112 (e.g., a glass or cup) for human consumption. The electro-mechanics of such beverage dispensing units 102 are common and well known.

Exemplary embodiments disclosed herein describe the use of the beverage dispensing system 100 for beverage that is beer. In this regard, the dispensing head is commonly referred to a tap 114. The tap 114 can include a tap head 116 and a tap dispenser 118. The tap dispenser 118 includes the connection lines from the beverage container to the port 110 of the dispensing unit 102. The tap dispenser 118 also includes a stem 120 for facilitating actuation of a disc 122. Actuation of the disc 122 allows for selective obstruction of the port 110. Obstructing the port 110 involves preventing flow of beverage out-from the port 110. As a non-limiting example, acting on the stem 120 can cause the disc 122 to rotate so as to generate a degree of obstruction in the port 110 (e.g., ranging from being fully obstructed to fully un-obstructed). The tap dispenser 118 can also have gaskets, flanges, valves, nozzles, etc. to facilitate the controlled containment and disbursement of beverage.

Figure 2:
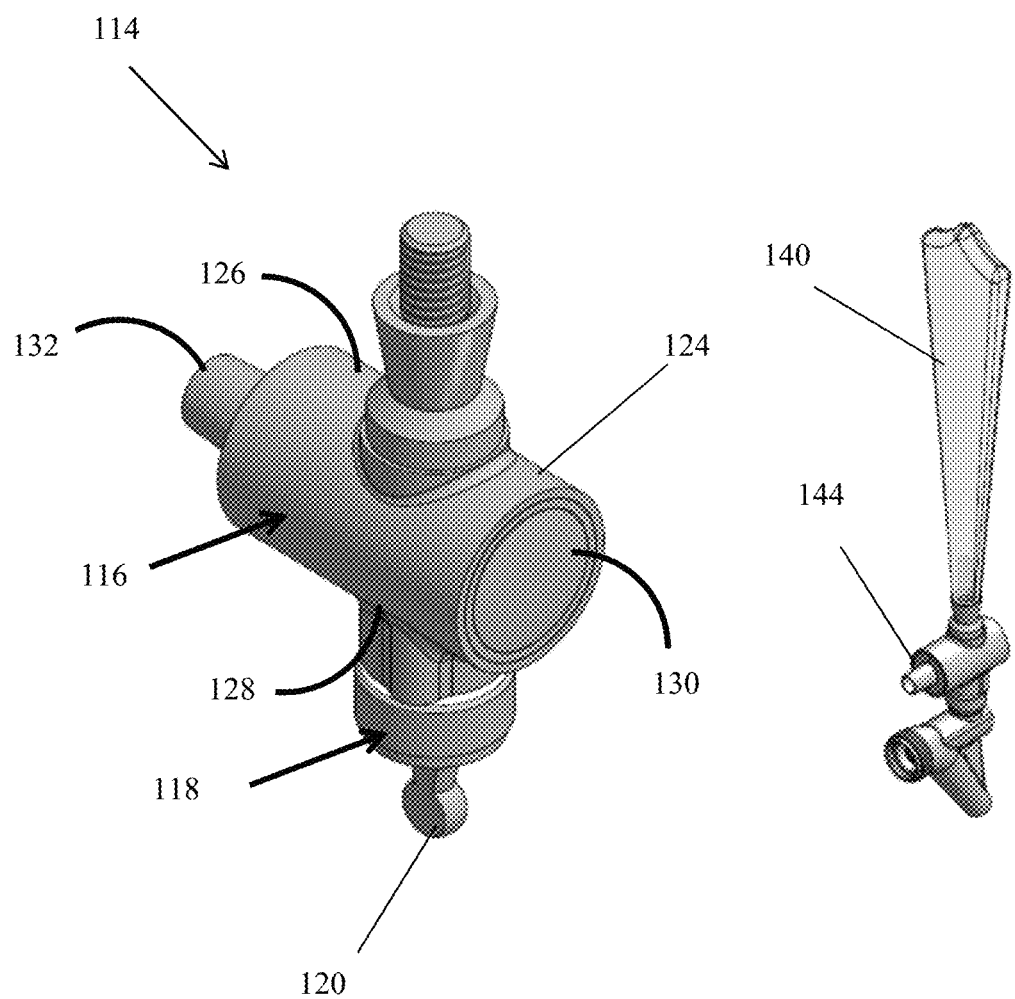
FIG. 2 shows an embodiment of the tap.
Figure 3:
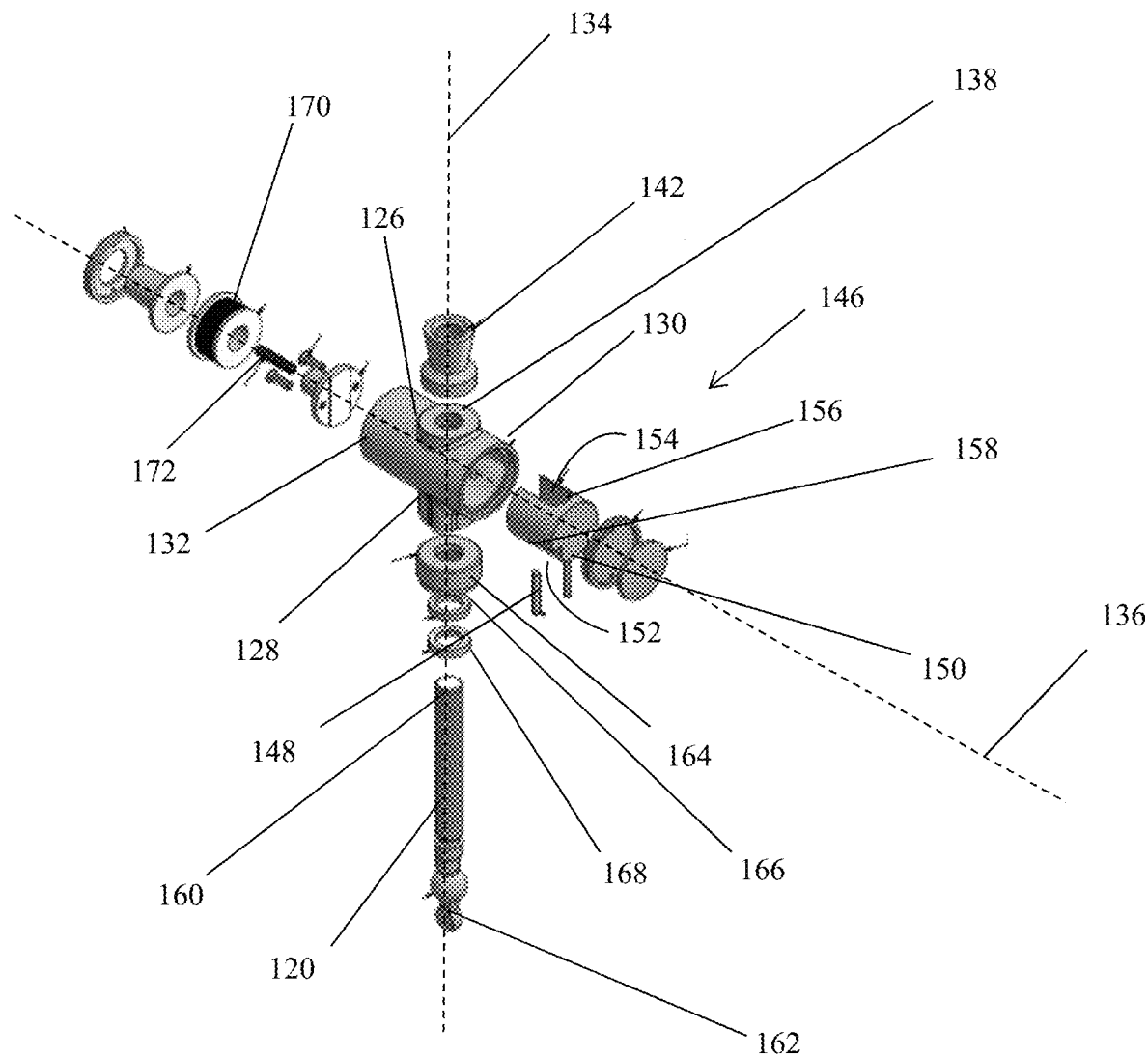
FIG. 3 shows an exemplary exploded view of an embodiment of the tap housing.
Figure 4:
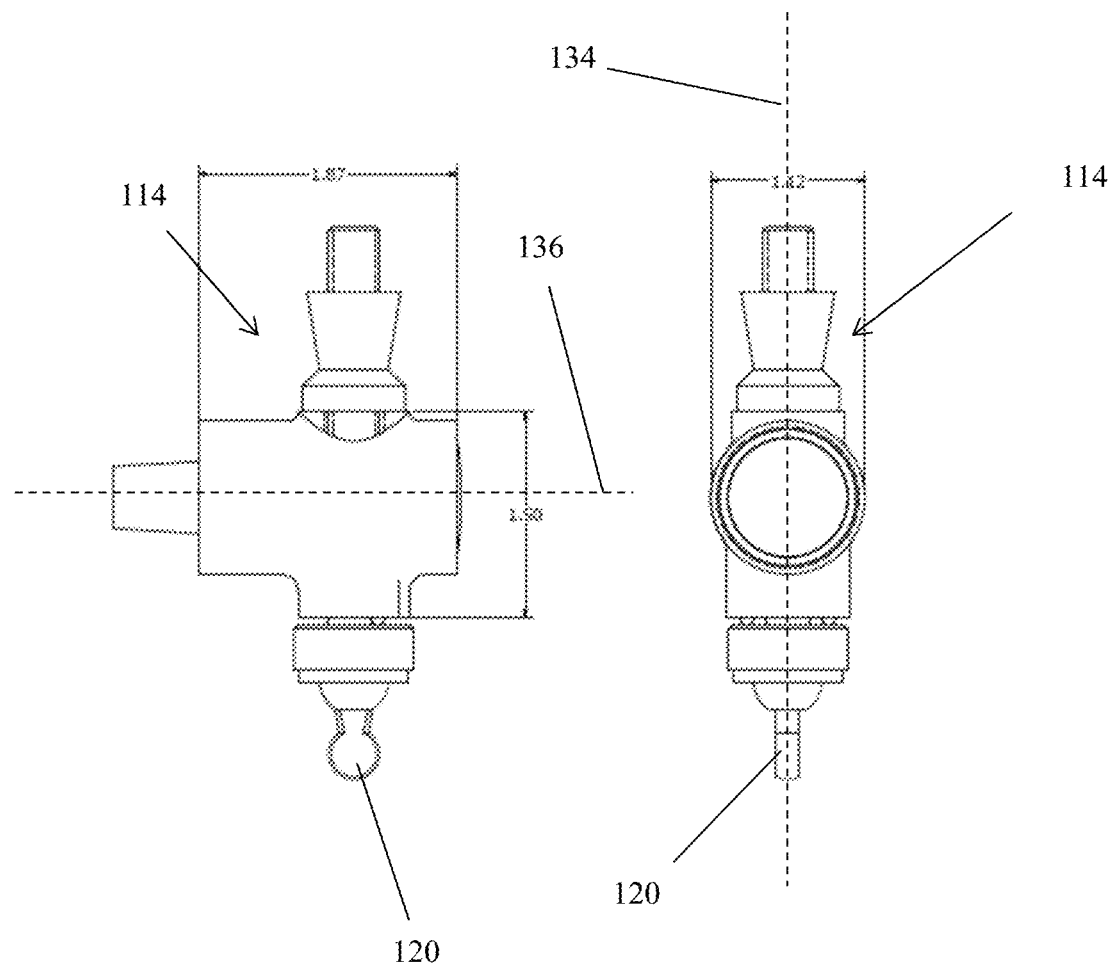
FIG. 4 shows a side view and a front view of an embodiment of the tap.

Referring to FIGS. 2-4, the tap head 116 includes a tap head housing 124 that is connected to the tap dispenser 118. This can be a permanent connection (so as to form an integral tap 114 unit) or a temporary connection (e.g., a threaded engagement). It is contemplated for the tap head 116 to be connectable to the tap dispenser 118 via a temporary connection so as to allow a user to interchange tap heads 116. This can also allow a user to remove an existing tap head (e.g., a conventional tap head) and replace it with an embodiment of the tap head 116 disclosed herein. Thus, a user can use an embodiment of the tap head 116 with a conventional tap dispenser 118. Therefore, if a user wishes to modify an existing dispensing unit to generate an embodiment of the beverage dispensing system 100, the user need only remove the tap head of the existing dispensing unit and replace it with an embodiment of the tap head 116 disclosed herein. In addition, the removability of the tap head 116 can facilitate easy removal for maintenance and cleaning.

The tap head housing 124 can be a hollow cylindrical (other shapes can be used) member having a tap head housing first end 126, a tap head housing second end 128, a tap head housing third end 130, and a tap head housing fourth end 132. The tap head housing first end 126 can be located at a top of the housing 124, the tap head housing second end 128 can be located at a bottom of the housing 124, the tap head housing third end 130 can be locate at a front of the housing 124, and the tap head housing fourth end 132 can be located at a rear of the housing 124. The tap head housing first end 126 can subtend the tap head housing second end 128 so as to form a tap head longitudinal axis 134 running from the tap head housing first end 126 to the tap head housing second end 128. The tap head housing third end 130 can subtend the tap head housing fourth end 132 so as to form a tap head latitudinal axis 136 running from the tap head housing third end 130 to the tap head housing fourth end 132. The tap head housing first end 126 can have a hand lever aperture 138 configured to receive a portion of a hand lever 140. Some embodiments can include a hand lever nut 142 configured to connect (e.g., via a threaded engagement) with the hand lever aperture 138 and support the hand lever 140 when the hand lever 140 is inserted into the hand lever aperture 138.

The hand lever 140 can be a member (e.g., a handle, elongated element, etc.) that is pivotable about a pivot point to cause a lever pin 144 move. For instance, when the hand lever 140 is connected to the tap head housing 124, actuation of the hand lever 140 (e.g., pivoting the hand lever 140 about its pivot point) causes the lever pin 144 to move along the tap head longitudinal axis 134.

A slide 146 can be located within the tap head housing 124 at or near the tap head housing third end 130. The slide 146 can be a hollow cylindrical (other shapes can be used) member configured to slidably retain a rod 148. For instance, the slide 146 can have a slide track 150 located on its bottom surface 152 and a lever pin opening 156 located in its top surface 154. The slide 146 is positioned within the tap head housing 124 so that the lever pin opening 156 can allow the lever pin 144 to move into and out from the hollow interior of the slide 146 via the lever pin opening 156. This can include being positioned so that the lever pin opening 156 is aligned with the hand lever aperture 138 of the tap head housing first end 126. The slide track 150 can run along the slide bottom surface 152 in the tap head latitudinal axis 136 so that the rod 148 can move along the tap head latitudinal axis 136 by traversing the slide track 150. The slide 146 is positioned within the tap head housing 124 so that the slide track 150 can allow the rod 148 to move into and out of alignment of the tap head longitudinal axis 134. This can include being positioned so that the rod 148 can be selectively aligned or mis-aligned with the hand lever aperture 138 of the tap head housing first end 126 and/or the stem aperture 158 of the tap head housing second end 128 (as will be explained in detail later, the tap head housing second end 128 can have a stem aperture 158 configured to receive a portion of the stem 120).

The slide track 150 can also be configured to allow the rod 148 to move along the tap head longitudinal axis 134. When the rod 148 is mis-aligned with the stem aperture 158 of the tap head housing second end 128, the rod 148 abuts against the sidewall of the tap head housing 124 of the tap head housing second end 128 and thus cannot moved along the tap head longitudinal axis 134. However, when the rod 148 is aligned with the stem aperture 158 of the tap head housing second end 128, the rod 148 does not abut against the sidewall of the tap head housing 124 (due to the absence of the sidewall via the stem aperture 158) and can then be moved along the tap head longitudinal axis 134.

Additional components to the tap head housing third end 130 can include end caps, fasteners, and covers to adequately contain the component parts of the slide 146.

The tap head housing second end 128 can have a stem aperture 158 configured to receive a portion of the stem 120. The stem 120 can be an elongated member having a stem first end 160 and a stem second end 162. The stem first end 160 can be received by the stem aperture 158. The stem second end 162 can be engaged with the disc 122 of the tap dispenser 118. Some embodiments can include a stem nut 164, a stem seal 166, and/or a stem guide 168 configured to connect with the stem aperture 158 and support 110 the stem 120 when the stem 120 is inserted into the stem aperture 158.

A switch 170 can be located within the tap head housing 124 at or near the tap head housing fourth end 132. The switch 170 can be configured to selectively cause the rod 148 to travel along the tap head latitudinal axis 136. This can include causing the rod 148 to travel along the slide track 150. For instance, the switch 170 can be a magnetic field generator (e.g., electro-magnet, a solenoid switch, etc.) that generates a magnetic field when activated. The magnetic field can impose an attractive force on the rod 148 (the rod 148 can be made of magnetic material) to cause the rod 148 to travel along the slide track 150 from the tap head housing third end 130 towards the tap head housing fourth end 132. This can include causing the rod 148 to move from being mis-aligned with the hand lever aperture 138 and stem aperture 158 to being aligned with the hand lever aperture 138 and stem aperture 158. The switch 170 can also have a spring 172 configured to engage the rod 148 as it moves from the mis-alignment position to the alignment position. Once the switch 170 is de-activated, the magnetic attractive force disappears and the spring 172 forces the rod 148 back to a mis-alignment position (e.g., biases the rod to the mis-alignment position). In the alternative, or in addition, the switch 170 can be configured to generate a magnetic field that imposes a repulsive force on the rod 148 to cause the rod 148 to move back to a mis-alignment position. Additional components to the switch 170 can include end caps, fasteners, and covers to adequately contain the component parts of the switch 170.

An exemplary, non-limiting implementation of the tap head 116 can be as follows. The tap head 116 can be attached to the tap dispenser 118, ensuring that the stem first end 160 is received by the stem aperture 158. This can involve removing a conventional tap head and replacing it with an embodiment of the tap head 116. The rod 148 can be motioned (or biased) to the mis-alignment position. The hand lever 140 can be inserted into the hand lever aperture 138. Actuation of the hand lever 140 will not engage the stem 120 when the rod 148 is in the mis-alignment position because the lever pin 144, when caused to move along the tap head longitudinal axis 134 towards the tap head housing second end 128, will not make contact with the stem first end 160. The tap head housing 124 is configured so that the hollow interior of the tap head housing 124 (e.g., the distance between the tap head housing first end 126 and the tap head housing second end 128) is too long for the lever pin 144 to engage the stem 120 when the rod 148 is in the mis-alignment position, even if the hand lever 140 is fully pivoted to extend the lever pin 144 as far as it can go.

The switch 170 can then be activated to cause the rod 148 to be in the alignment position. Actuation of the hand lever 140 can now engage the stem 120 when the rod 148 is in the aligned position because the rod 148 acts as a cantilever facilitating mechanical engagement between the lever pin 144 and stem 120 such that when the lever pin 144 is caused to move along the tap head longitudinal axis 134 towards the tap head housing second end 128, the motion is transferred through the rod 148 and to the stem 120. The movement can cause the stem 120 to actuate the disc 122 and control the flow of beverage from the port 110. It should be noted that no beverage flows though the tap head 116 at all. Instead, the tap head 116 controls operation of the stem 120 of the tap dispenser 118, and the beverage flows though the tap dispenser 118.

Figure 5:
FIGS. 5 and 6 show different views of a push-button embodiment of the tap.
Figure 5:
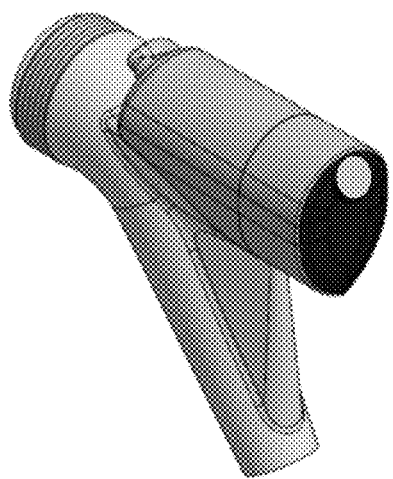
Figure 6:
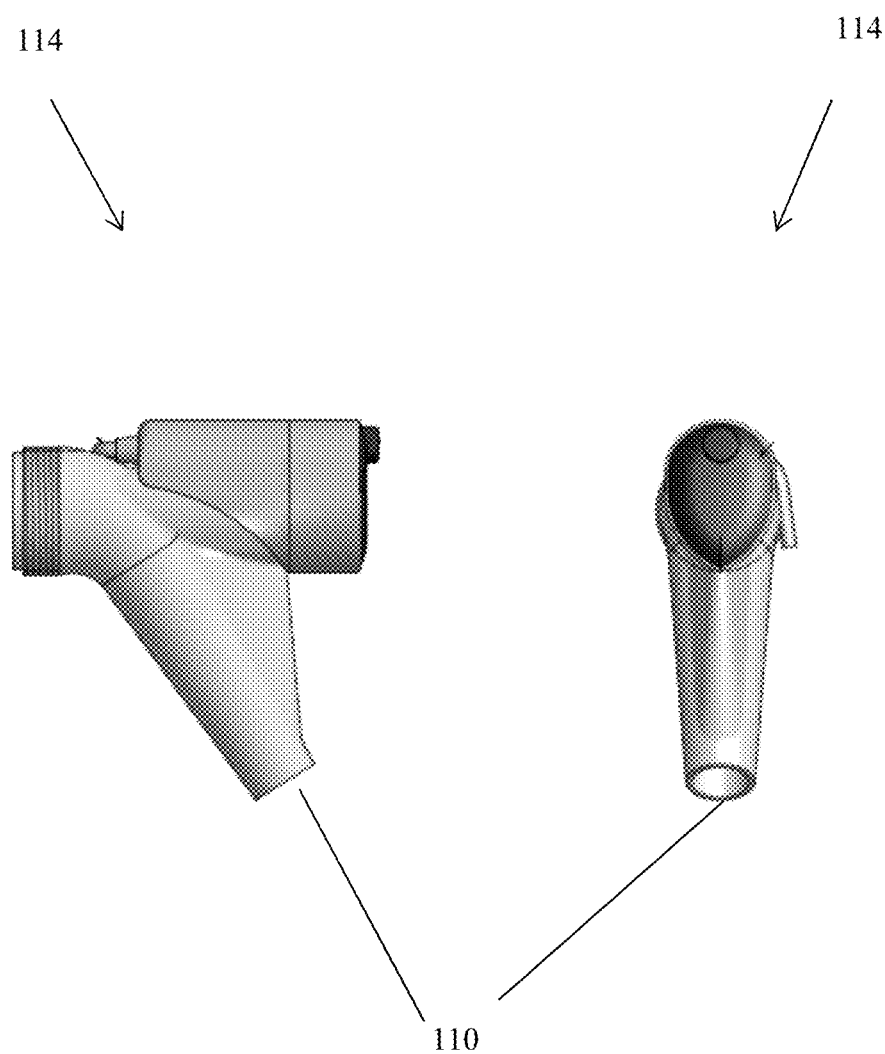
Figure 7:
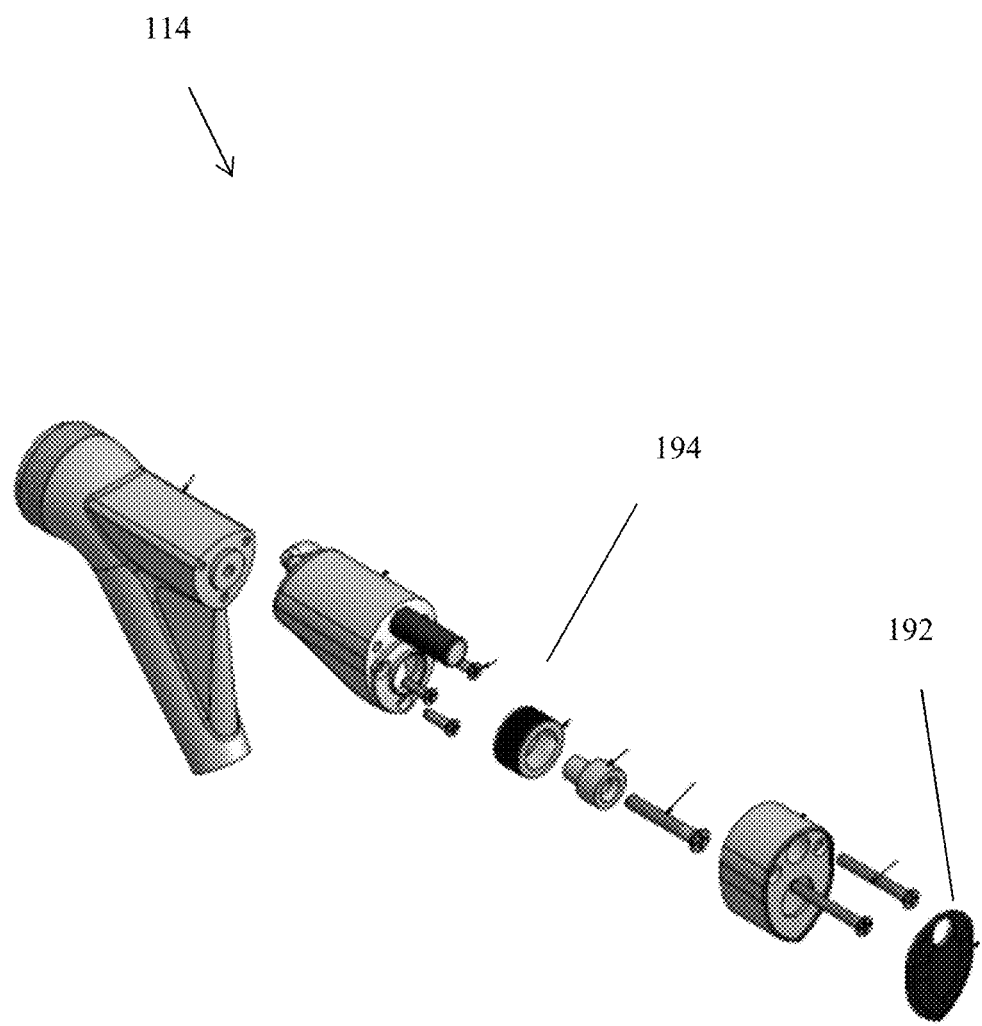
FIG. 7 shows an exemplary exploded view of an embodiment of the tap housing illustrated in FIGS. 5-6.
Figure 12:
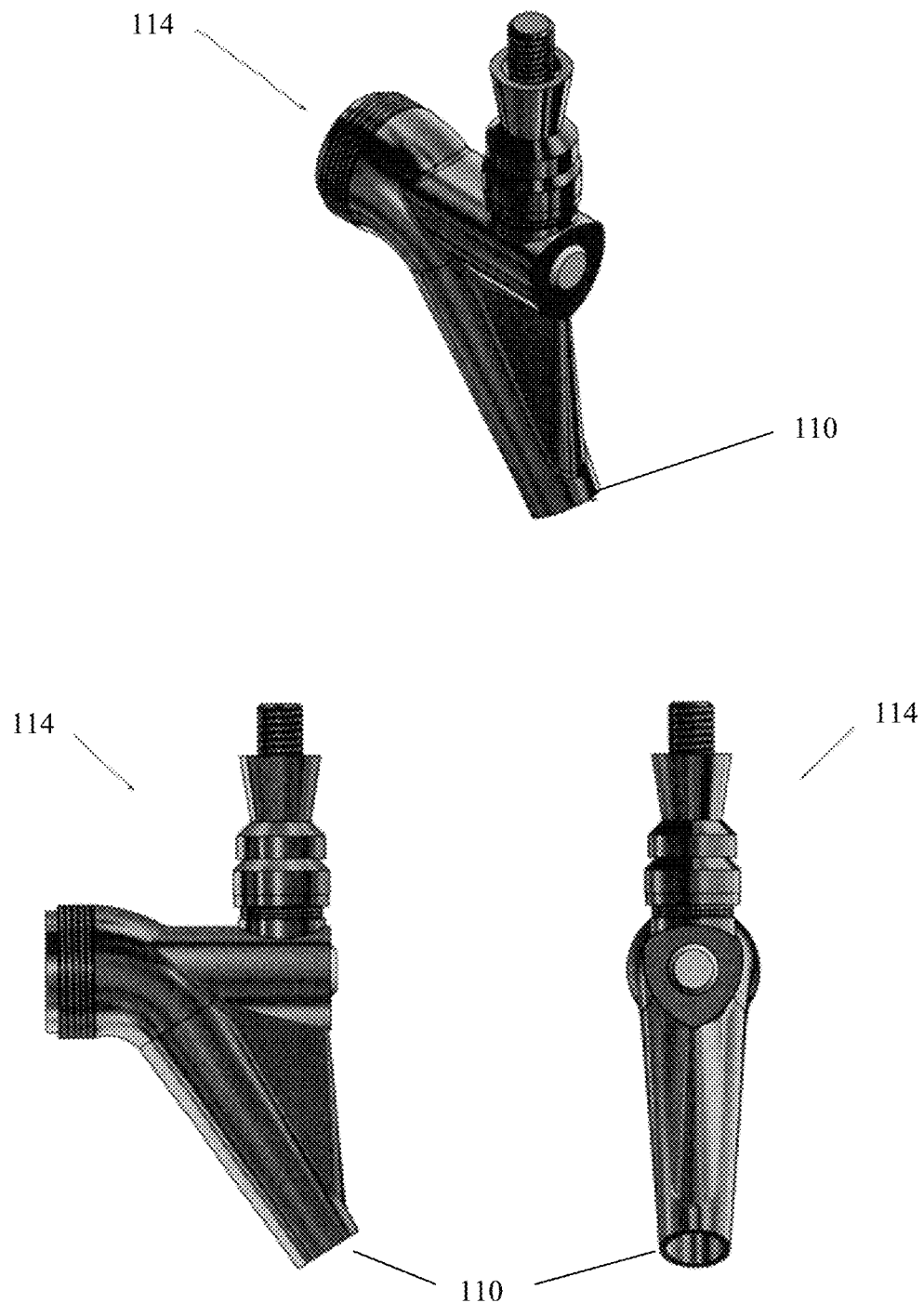
FIG. 12 shows an alternative embodiment of a tap that may be used with an embodiment of the system.

Referring to FIGS. 5-7, exemplary embodiments of a push-button version of the tap 114 are disclosed. Some embodiments of the tap 114 can include a push-button 192 that activates a gear assembly to act upon the stem 120. In these embodiments, the push button 192 can be connected to a switch 194 (e.g., a relay switch) that selectively makes an electrical connection to activate the gear assembly based on the marker information. For instance, if the antenna 186 detects a marker 190, the switch 194 can complete an electrical connection such that activating the push button 192 will cause the gear assembly to act upon the stem 120. If the antenna 186 does not detect a marker 190, the switch 194 can leave open an electrical connection such that activating the push button 192 will not cause the gear assembly to act upon the stem 120. FIG. 12 shows an alternative embodiment of a tap 114 that may be used with the system 100.

Figure 8:
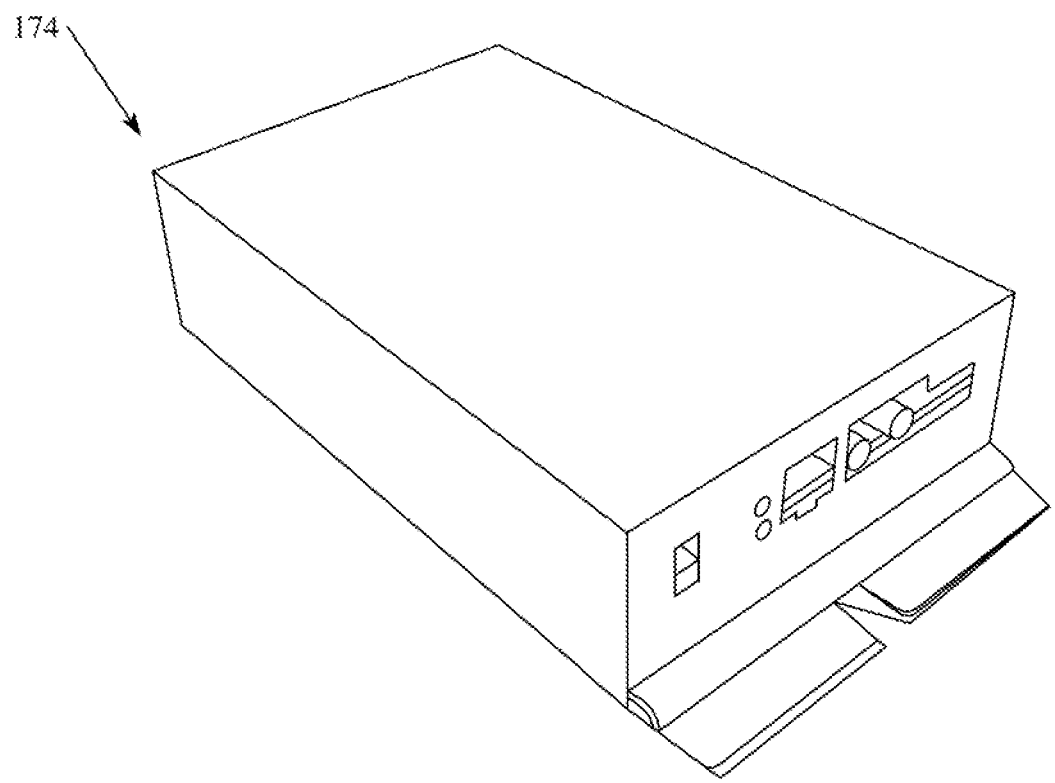
FIG. 8 shows an exemplary embodiment of the control module.
Figure 8:
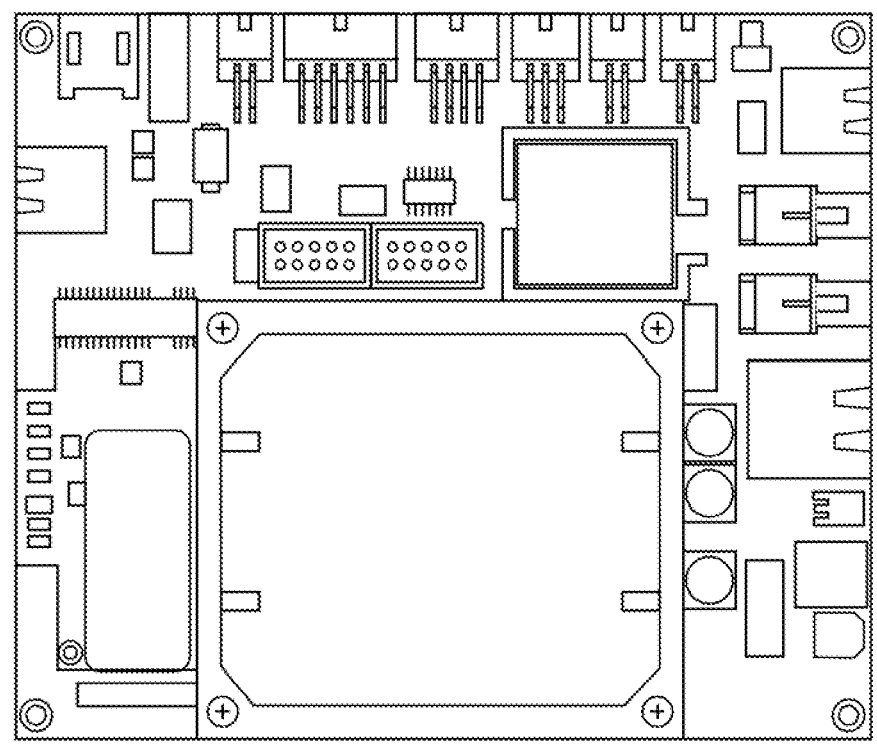

Referring to FIG. 8, some embodiments of the beverage dispensing system 100 can include a control module 174. The control module 174 controls the switching of the switch 170 along with other aspects of the beverage dispensing system 100 that will be disclosed later. Also explained in more detail later are other components that may be part of the beverage dispensing system 100, which can include a computer device 176, a display 178, an identification monitoring module 180, a vessel tilt device 182, a hand lever tilt device 184, a reader 186, and sensors. Any one or combination of the control module 174, the computer device 176, the switch 170, the display 178, the identification monitoring module 180, the vessel tilt device 182, the hand lever tilt device 184, the reader 186, and the sensors can have, or be in connection with, a processor unit and/or a transceiver unit. This can be done to allow any one of these components to communicate with each other, transmit and receive command signals, act upon each other, etc. For example, any of these components can have an application programming interface (API) and/or other interface configured to facilitate the control module 174 and/or computer device 176 that is in communication with that component executing commands and controlling aspects of the beverage dispensing system 100. For instance, embodiments of the control module 174 and/or computer device 176 can be programmed to generate a user interface configured to facilitate control of and display of various operational aspects of the beverage dispensing system 100.

The control module 174 architecture can be configured as a single board computer that incorporates two Radio Frequency Identification (RFID) ports, a multiple General Purpose Input/Output (GPIO) port, and on-board relays. The control module 174 architecture provides the ability to switch processors via a computer-on-module (COM) express module. The COM express module can be a processing unit configured to integrate core Central Processing Unit (CPU) and memory functionalities of Personal Computer Advanced Technology Input/Output (PC/AT I/O), Universal Serial Bus (USB), audio, graphics, and local area networking, in which all I/O signals can be mapped to high density, low profile connections. Embodiments of the COM express module architecture can be structured as a mezzanine-based approach to allow the COM express module to be plug into an application-specific baseboard. The control module 174 architecture can further include a removable hard drive and a built-in RFID reader with on-board multiplexer. The control module 174 architecture provides a versatile design that can be used as a single common hardware platform for multiple dispensing units 102.

In some embodiments, the control module 174 can be hardwired to the switch 170. This hardwire connection can allow the control module 174 to supply the electrical power necessary to operate the switch 170 and provide the communication link between the control module 174 and the switch 170. In some embodiments, the control module 174 can be in wireless communication with the switch 170 (e.g., via a transceiver). In such cases, the tap head 116 can include a battery unit in connection with the switch 170 to supply the necessary electrical power to operate the switch 170. The battery unit can be a re-chargeable battery unit.

Figure 9:
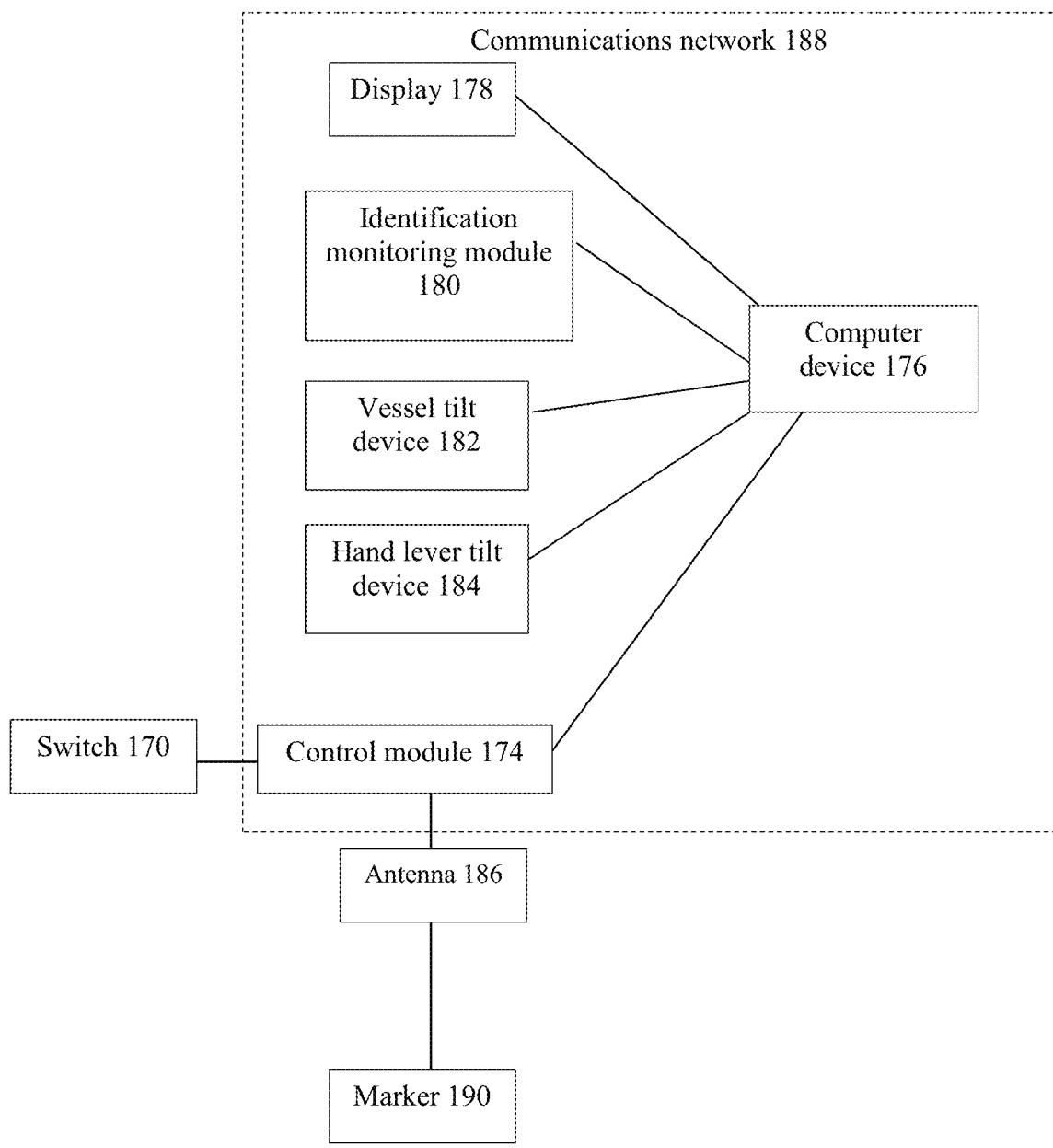
FIG. 9 shows an exemplary architecture of a computer system network that can be used with an embodiment of the system.

Referring to FIG. 9, some embodiments of the beverage dispensing system 100 can include a computer device 176. The computer device 176 can be a processor with an associated memory (e.g., a database). The computer device 176 can be a personal computer, laptop computer, mainframe computer, server, electronic mobile device (e.g., smartphone, tablet, etc.), etc. The computer device 176 can be used to control various aspects of the beverage dispensing system 100, establish user interfaces, establish a computer system network (e.g., a network of a plurality of dispensing systems 100, computer devices 176, etc.), establish a communications network 188, process certain data, send and retrieve data to and from the database, etc.

Any of the processors disclosed herein can be at least a one of a scalable processor, parallelizable processor, and optimized for multi-thread processing capabilities. The processor can be a supercomputer or a quantum computer in which the processing power is selected as a function of anticipated network traffic (e.g. data flow). The processor can include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Various functional aspects of the processor may be implemented solely as software or firmware associated with the processor.

Any of the memories disclosed herein can be optionally associated with a processor. Embodiments of the memory can include a volatile memory store (such as RAM), a non-transitory, non-volatile memory store (such as ROM, flash memory, etc.), or some combination of the two. For instance, the memory can include, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the processor. According to exemplary embodiments, the memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission media.

Transmission media includes coaxial cables, copper wire and fiber optics, including the wires that include or form a bus. Transmission media can also take the form of acoustic or light waves, such as those generated during radio-wave and infrared data communications, or other form of propagated signals (e.g., carrier waves, infrared signals, digital signals, etc.). Forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Instructions for implementation of any of the method disclosed herein can be stored on a memory in the form of computer program code. The computer program code can include program logic, control logic, or other algorithms that may or may not be based on artificial intelligence (e.g., machine learning techniques, artificial neural network techniques, etc.).

Any of the components of the beverage dispensing system 100 can be part of, or in connection with, a communications network 188. For example, any of the components can include switches, transmitters, transceivers, routers, gateways, etc. to facilitate communications via a communication protocol that facilitates controlled and coordinated signal transmission and processing. The communication links can be established by communication protocols that allow components to form a communication interface. For instance, the communication interface can be configured to allow the computer device 176 and another component of the system 100 to form a communications network 188. The communications network 188 can be configured as a long range wired or a wireless network, such as an Ethernet, telephone, Wi-Fi, Bluetooth, near-filed communication (NFC), wireless protocol, cellular, satellite network, cloud computing network, etc. Embodiments of the communications network 188 can be configured as a predetermined network topology. This can include a mesh network topology, a point-to-point network topology, a ring (or peer-to-peer) network topology, a star (point-to-multiple) network topology, or any combination thereof.

The beverage dispensing system 100 can include a marker 190. The marker 190 can include an information-bearing mark. This can include paint, ink, barcode, fluorescent pigment, magnetic strip material, condition-response smart material, embossed material, imprinted material, RFID tag (active or passive), ultraviolet light responsive material, etc. The marker 190 can be associated with the vessel 112. This can include being attached to the vessel 112, molded into the vessel 112, formed in or on the vessel 112, embedded within the vessel 112, printed on the vessel 112, written as code on the vessel 112, attached as a film on the vessel 112, etc. The marker 190 can also be a sensor. Any one type or combination of types of markers 190 can be used. The marker 190 can be configured to exhibit a certain detectable property (e.g., have a certain shape, have a certain thickness, have a certain pattern, emit a certain wavelength, generate a certain chemical response, emit a certain signal, have a certain temperature, exhibit a certain optical, magnetic, and/or mechanical property, etc.). This detectable property can be used as information for identifying, tracking, and/or monitoring the vessel 112 the beverage dispensed in the vessel 112, and/or the habits of a user using the vessel 112, consuming beverage, and/or using the system 100.

The information in the marker 190 can be read by reader 186. The antenna 186 can be a scanner, a camera, etc. The information in the mark can be encoded by the computer device 176. It is contemplated for the marker 190 to be able to be re-coded to provide updated information, so the marker 190 should be able to be written and re-written with the information. As will be explained in detail later, the beverage dispensing system 100 can be configured to track various aspects of its use and control various aspects of its operation based on that used. For instance, the beverage dispensing system 100 can be configured: a) to identify individuals who are authorized (e.g., age requirement, being a member of a club, etc.) to use the beverage dispensing system 100 to obtain a certain type of beverage from a certain tap and control the disbursement of beverage based on that information; b) identify the type, shape, and contour of vessel 112 used by the user and control the disbursement of beverage based on that information; c) identify the amount or frequency of drinks a user consumes and control the disbursement of beverage based on that information (including setting a wait period before the user can obtain another drink); d) identify the amount of beverage a user has dispensed and notify the user the amount of beverage left to be disbursed based on that information (as well as control the disbursement of beverage based on that information); e) identify the type of beverage from a certain tap along with the type, shape, and contour of the vessel 112 and control the disbursement of beverage based on that information; f) identify the temperature at which the beverage is being stored in the beverage container and notify the user of the current temperature and the preferred temperature (as well as control the disbursement of beverage based on that information); g) identify the amount of beverage left in the beverage container and track the beverage containers in storage to notify the user of the same, provide an estimated wait time for replenishment, and control the disbursement of beverage based on that information; h) determine the caloric intake a user consumes and notify the user of the same; i) track when, where, and the type of beverage a user consumes over a given period; etc. In this regard, the marker 190, after being associated with the vessel 112, can have the marker information encoded into it by the computer device 176. The marker information can include personal ID information about the user (e.g., name, age, whether the user is a member of an association, biometric data such as fingerprint information, retina information, etc.), vessel information (e.g., type, shape, size, and contour of the vessel 112), and account use information (e.g., whether the user established an account and how much beverage the user purchased via that account, the number of fills or re-fills a user is able to obtain based on the amount of beverage the user purchased, statistical data regarding the user's beverage dispensing system 100 use (or use of other beverage dispensing system 100 on the computer system network), behavioral trends based on the statistical data, etc.). In some embodiments, he marker information can also be transmitted to the database for storage, analysis, and retrieval by the computer device 176.

Figure 10:
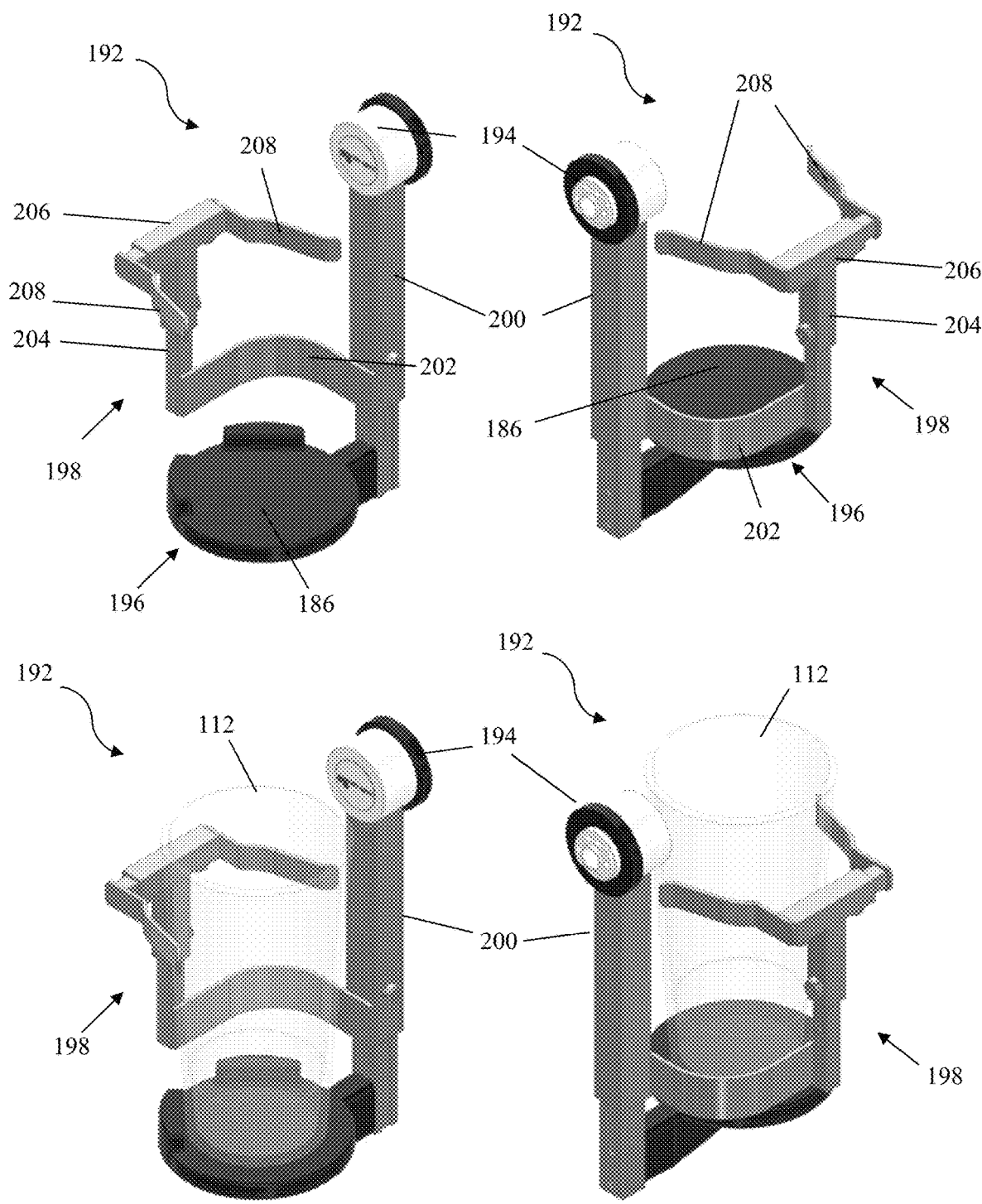
FIGS. 10-11 show exemplary embodiments of a vessel tilt device that can be used with an embodiment of the system.

The beverage dispensing system 100 can include a antenna 186 configured to acquisition the marker information and transmit it to the control module 174 and/or computer device 176. The antenna 186 can be any one or combination of a scanner, a camera, etc. The type of antenna 186 would depend on the type of marker 190 being used. The antenna 186 can be located in or on the dispensing unit 102 (e.g., the tray 106 or the housing 104), in or on the tap 114, in or on any other component of the beverage dispensing system 100, and/or placed in a location that is not in or on any of the components of the dispensing system 100 (e.g., on a structure separate from the dispensing unit 102). For example, FIG. 10 shows the antenna 186 as forming the base 196 of the vessel tilt device 182 upon which the vessel 112 rests. It is contemplated for the antenna 186 to be able to acquisition the marker information from the marker 190 when the vessel 112 is placed near the tap 114 so the placement should be conducive for effective and efficient marker data acquisitioning when the vessel 112 is placed near the tap 114.

The beverage dispensing system 100 can include a display 178 configured to display information about the beverage dispensing system 100, the use of the beverage dispensing system 100 (e.g. type beverage consumed, number of times the system has been used, wait times for disbursement of the next beverage, etc.), operational aspects of the beverage dispensing system 100 (e.g., temperature of the beverage, whether a beverage is out of stock, recommended dispensing flow rate, actual dispensing flow rate, amount of beverage dispensed, recommended angle of tilt for the vessel 112, actual angle of title for the vessel 112, amount of beverage left in the beverage container 108, whether the switch 170 is activated, whether the rod 148 is in the mis-alignment or alignment position, etc.), marker information (e.g., whether the vessel is invalid for use), personal ID information (e.g., whether the use if authorized for use), vessel information (e.g., type, size, shape, and contour of vessel 112, etc.), account use information (e.g., number of fills obtained, number of re-filled remaining, etc.), instructions or tutorials about the beverage dispensing system 100, advertisements content, marketing content, entertainment content, etc. The display 178 can be a monitor (e.g., light emitting diode (LED) array, liquid crystal display (LCD) array, etc.) configured to display a user interface or a display screen. The information can be displayed as textual information or graphical information. The text can be scrolling, flashing, animated, etc. The display 178 can be located in or on the dispensing unit 102 (e.g., the housing 104), in or on the tap 114, in or on any other component of the beverage dispensing system 100, and/or placed in a location that is not in or on any of the components of the dispensing system 100 (e.g., on a structure separate from the dispensing unit 102).

Figure 13:
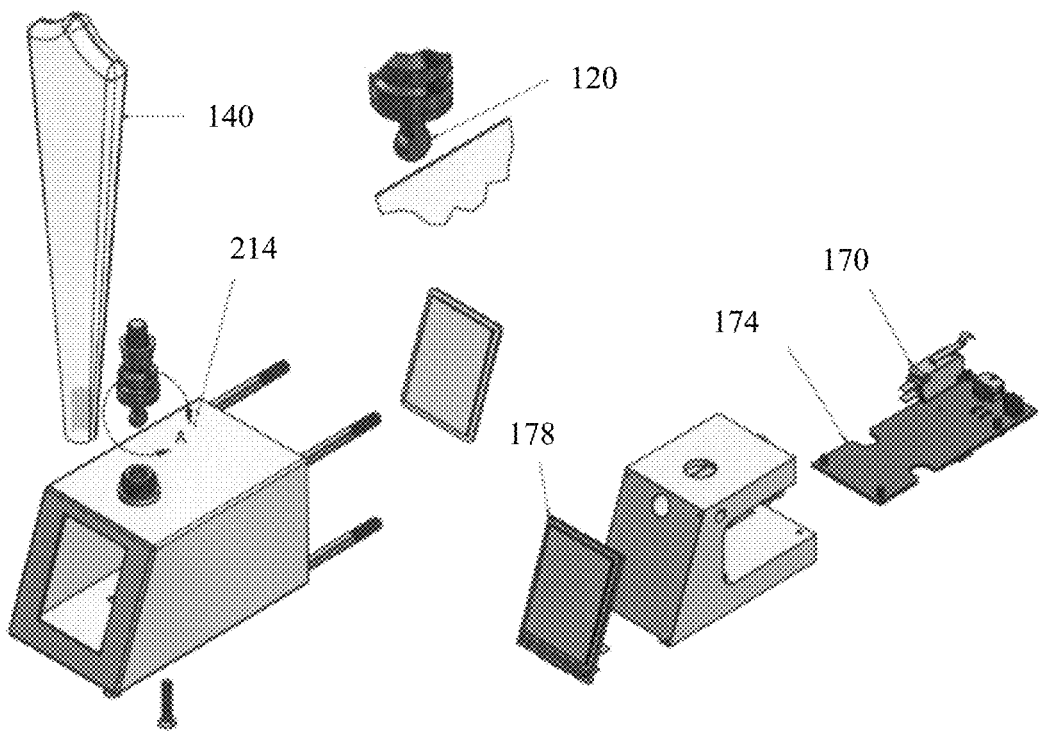
FIG. 13 shows an embodiment of the tap with a display within the tap head portion of the tap.

In some embodiments, the display 178 includes an LED array having a color coded scheme to instruct the user about the usage of the beverage dispensing system 100. For instance, the LED array can include a first LED configured to emit light of a first wavelength (e.g., visible green light), a second LED configured to emit light of a second wavelength (e.g., visible yellow light), and a third LED configured to emit light of a third wavelength (e.g., visible red light). The green light can be an indicator that re-fills are available for the user. The yellow light can be an indicator that re-fills are available for the user but that the user has to wait a pre-determined amount of time (e.g., wait for the beverage to be re-stocked, wait for the beverage to reach a recommended temperature, wait a pre-determined amount of time to avoid reaching a threshold level of alcohol intoxication, etc.). The red light can be an indicator that no re-fills are available for the user. FIG. 1 shows the display 178 on a housing 104 portion of the system 100, but the display 178 can be positioned anywhere on the system 100. For instance, the display 178 may be positioned on a front facing face (facing the user) of the tap head 116 within a display housing 214 of the tap head 116 (see FIG. 13).

As will be explained in detail later, the control module 174 and/or the computer device 176 processes the information and coordinate activities of each component to achieve the above-identified scenarios. The control module 174 and/or the computer device 176 can also provide the display 178 with commands to generate the information identified above.

The beverage dispensing system 100 can include an identification monitoring module 180. This can be a device that scans for, acquisitions, or receives information to confirm the identity of a user. For example, the identification monitoring module 180 can be configured to obtain the personal ID information from the user. The identification monitoring module 180 can be located in or on the dispensing unit 102, in or on the tap 114, in or on any other component of the beverage dispensing system 100, and/or placed in a location that is not in or on any of the components of the dispensing system 100 (e.g., on a structure separate from the dispensing unit 102). The identification monitoring module 180 can be a card scanner (e.g., scanning an ID card or membership card), a token scanner (e.g., a fob reader), a biometric scanner (e.g., fingerprint scanner, retina scanner, voice recognition unit, etc.), etc. The personal ID information collected by the identification monitoring module 180 can be transmitted to the computer device 176 for a comparison to the personal ID information stored in the database and/or on the marker 190. If a match is made, then the user can be designated as an authorized user for the beverage dispensing system 100. For instance, the system 100 can be configured so that a user cannot use the system 100 to dispense beverage unless the marker 190 of the vessel 112 has been scanned so that the switch 170 can be activated. Yet, even if the marker 190 has been scanned and the marker information is processed so that the switch 170 is activated, the system 100 can still prevent disbursement of beverage if the user attempting to use the vessel 112 has not been validated (e.g., is determined to be an authorized user) via the identification monitoring module 180. Thus, the system 100 can be configured to prevent an unauthorized user from using the vessel 112 and/or from obtaining beverage from the dispensing unit 102 regardless of the type of vessel used. Use of the identification monitoring module 180 can reduce or eliminate the need for performing ID checks by humans.

The beverage dispensing system 100 can include a hand lever tilt device 184. This can be a device that actuates the hand lever 140. Thus, the actuation of the hand lever 140 can be manual (performed manually by a user) or automatic (performed by the hand lever tilt device 184). The hand lever tilt device 184 can be located in or on the dispensing unit 102, in or on the tap 114, in or on any other component of the beverage dispensing system 100, and/or placed in a location that is not in or on any of the components of the dispensing system 100 (e.g., on a structure separate from the dispensing unit 102). As the hand lever tilt device 184 is contemplated for acting upon the hand lever 140, it should be located proximate the hand lever 140. The hand lever tilt device 184 can include a rotatable motor with a shaft and an encoder to control the amount and rate of rotation. The shaft is configured to engage with the hand lever 140 to cause the hand lever 140 to rotate as the shaft rotates. As noted above, when the rod 148 is in the alignment position, rotation of the hand lever 140 causes the lever pin 144 to act upon the rod 148 and transfer motion to the stem 120. The more the stem 120 moves, the more the disc 122 rotates, resulting in less and less obstruction of the port 110. Thus, the amount and rate of rotation of the shaft via the encoder can influence the amount and rate at which beverage is disbursed from the port 110. As will be explained later, the amount and rate of beverage flow can be controlled by the control module 174 and/or computer device 176 to provide a preferred or controlled pour. Certain types of beer will exhibit different tastes depending on the fluid dynamics of the pour. The preferred or controlled pour is a flow rate and fluid amount that maximizes the fluid dynamics to achieve a certain taste and/or visual effect. The preferred or controlled pour can depend on the type of beer, the temperature of the beer, the type, shape, and contour of the vessel 112, the tilt of the vessel 112, etc., which can all be factored by the control module 174 and/or computer device 176. The control module 174 and/or computer device 176 can transmit command signals to the hand lever tilt device 184 to control the fluid dynamics of the pour accordingly.

The fluid dynamics of the pour can also be influenced by the tilt of the vessel 112. The beverage dispensing system 100 can include a vessel tilt device 182. This can be a device that supports the vessel 112 in a tilted position under the port 110. For instance, the vessel tilt device 182 can be located on the tray 106 or on the housing 104 under the port 110. As an example, the vessel tilt device 182 can be a cradle 192 supported by a motorized rotary unit 194 (e.g., a gimbal assembly) that can adjust for pitch, roll, and/or yaw. The cradle 192 can be configured to hold the vessel 112. After the vessel is in the cradle 192, the rotary unit 194 can be actuated to adjust the pitch, roll, and/or yaw so as to generate a title for the vessel 112 that will augment maximizing the fluid dynamics of the pour.

It should be noted that activating the switch 170 to cause the rod 148 to move to the alignment position does not cause the beverage to flow, but rather it only allows the hand lever 140 to engage the stem 120 when the hand lever 140 is pivoted. Only actuating the hand lever 140 so that it acts upon the stem 120 will cause the beverage to flow from the port 110. Some embodiments of the system 100 can be configured so that the hand lever 140 cannot be pivoted without activation of the hand lever tilt device 184 (e.g., there cannot be a manual actuation of the hand lever 140). In addition, the system 100 can be configured so that the hand lever tilt device 184 will not actuate unless the identification monitoring module 180 validates the user as an authorized user. Thus, the antenna 186 and the switch 170 (in conjunction with the control module 174 and/or the computer device 176) can be used to determine the type of beverage, the type pour and degree of tilt for the vessel 112, the wait time (if any), whether any fills or refills remain for the vessel 112, etc., and the identification monitoring module 180 and the hand lever tilt device 184 (in conjunction with the control module 174 and/or the computer device 176) can be used to determine whether to allow flow of beverage.

Some embodiments of the beverage dispensing system 100 can include a dispensing unit 102 with a plurality of ports 110 and beverage containers 108, wherein each port 110 is associated with an individual beverage container 108 so as to disburse a different type of beverage from each port 110. Accordingly, the dispensing unit 102 would have a plurality of taps 114, each tap 114 being associated with an individual beverage container 108 and port 110 to control the flow of the different types of beverage. Embodiments with a plurality of taps 114 can include a plurality of hand lever tilt devices 184 for each hand lever 140 of each tap 114 (e.g., an individual hand lever tilt device 184 for each individual hand lever 140 of each individual tap 114). It is contemplated for the plurality of taps 114 to be arranged in an array; however, other arrangements can be used. With an array of taps 114, the hand lever tilt device 184 can include a cross-bar with a plurality of rotatable motors and shafts (and encoders), each individual rotatable motor and shaft configured to engage with an individual hand lever 140.

An exemplary, non-limiting implementation of the beverage dispensing system 100 can be as follows. A user can set up an account by purchasing a vessel 112 and/or purchasing a number of fills or re-fills for the vessel 112 via the computer device 176, thereby establishing account use information. Account use information can include whether the user established an account, how much beverage the user purchased via the account, the type of beverage purchased via the account, the number of fills or re-fills a user is able to obtain based on the amount of beverage the user purchased, statistical data regarding the user's beverage dispensing system 100 use (or use of other beverage dispensing system 100 on the computer system network), behavioral trends based on the statistical data, etc. The user also enters personal ID information into the computer device 176. Personal ID information can include name, age, whether the user is a member of an association, metric data such as fingerprint data, retina data, etc. The vessel information is also entered into the computer device 176. The vessel information can include type, shape, size, and contour of the vessel 112. The account use information, the personal ID information, and the vessel information are transmitted to the database and/or the marker 190. Any one or combination of the account use information, personal ID information, and vessel information can be used to generate marker information via the computer device 176, which is also stored in the database and/or the marker 190. The marker 190 of the vessel 112 is encoded with marker information via the computer device 176.

A user approaches an embodiment of the dispensing unit 102 having an embodiment of the tap head 116 attached thereto. A user positions the vessel 112 to be proximate the antenna 186 to that the marker information can be acquisitioned from the marker 190. The marker information is transmitted to the computer device 176 and/or the control module 174. The computer device 176 can transmit some or all of the marker information to the display 178 for display thereof. The computer device 176 can transmit commands signals to the display 178 to cause the display 178 to display instructions or tutorials related to the use of the system 100. The computer device 176 can transmit command signals to the display 178 to cause the display 178 to display advertising, marketing, and/or entertainment content. The advertising, marketing, and/or entertainment content can be based on the account use information and/or the personal ID information, which can include tailoring the content to the user, the user's user of the system 100, the type of beverage the user tends to consume, etc.

The marker information acquisitioned by the reader can be compared to marker information stored in the database via the computer device 176 and/or the control module 174 or the identification monitoring module 180. This can be done to determine if the vessel 112 is valid (e.g., the account of the user has fills or re-fills that were purchased), that the user associated with the vessel 112 has not been barred from used of the system 100, that the user associated with the vessel 112 is a member of an association, that the user associated with the vessel 112 has not consumed a threshold amount of beverage or has not exceeded a threshold number of fills or refills in a pre-determined period of time, etc. The computer device 176 and/or control module 174 can cause the display 178 to indicate the status of any of these determinations. In addition, the computer device 176 and/or control module 174 can generate a menu of possible beverage options based on the marker information, account use information, personal ID information, and/or vessel information.

The control module 174 can then activate or not activate the switch 170 based on any of these determinations. For instance, if the user has consumed a 20 oz. alcoholic beverage five minutes before attempting to obtain a refill, the control module 174 can be configured to not activate the switch 170 (e.g., would not allow the rod 148 to be moved to the alignment position). Instead, the control module 174 can be programed to wait a pre-determined time period before activating the switch 170. As another example, if the user paid for beverage-1 but not for beverage-2, then control module 174 would activate the switch 170 for the tap 114 associated with beverage-1 but not activate the switch 170 for the tap 114 associate with beverage-2. Again, the computer device 176 and/or control module 174 can cause the display 178 to indicate the status of any of these determinations.

Once the switch 170 is activated, the user can then actuate the hand lever 140 to cause beverage to flow from the port 110. Alternatively, the hand lever tilt device 184 can automatically actuate the hand lever 140 to cause beverage to flow from the port 110. It is contemplated for the antenna 186 to be positioned such that in order for the marker information to be acquisitioned, the vessel 112 would have to be situated so that disbursement of beverage can occur as, or immediately after, the marker information is being acquisitioned.

In some embodiments, the user will have to validate her identity before actuation of the hand lever 140 can occur. This can be achieved via the identification monitoring module 180. The user can enter personal ID information via the identification monitoring module 180, which is then transmitted to the computer device 176 for a comparison to the personal ID information stored in the database and/or the marker 190. If a match is made, then the user can be designated as an authorized user for the beverage dispensing system 100. For instance, it may be desired to require a user to be a certain age to use the system 100, and thus the comparison can be done to ensure the user is a user who's age has already been verified. If the user is determined to be an authorized user, the computer device 176 and/or control module 174 can transmit a command signal to actuate the hand lever tilt device 184. Again, the computer device 176 and/or control module 174 can cause the display 178 to indicate the status of any of these determinations.

In some embodiments, the user can place the vessel 112 in the vessel tilt device 182. The computer device 176 and/or the control module 174 can use the marker information (e.g., the vessel information and the type of beverage) to determine the tilt for the vessel 112 that would provide the preferred pour. For instance, the vessel information may indicate that the vessel is a pilsner glass and the beverage is a certain type of pilsner beer, and thus the control module 174 can determine the degree of tilt required to achieve the preferred pour. The control module 174 can transmit command signals to the vessel tilt device 182 to cause it to adjust in pitch, roll, and yaw so as to situate the vessel 112 so that the tilt is achieved for the preferred pour. Again, the computer device 176 and/or control module 174 can cause the display 178 to indicate the status of any of these determinations.

As noted above, the control module 174 can be configured to determine the preferred pour for the type of vessel 112 and the type of beverage. Determining the preferred pour can include factors of: 1) the type, shape, size, and contour of the vessel 112; 2) the temperature of the beverage; 3) the flow rate of the beverage; 4) the type of beverage; 5) the tilt of the vessel 112; the desired head on the beer after it is poured; 6) the head to body ratio of the pour; etc. These factors can be controlled by adjusting the operating parameters of flow rate (via adjustment of the hand lever 140 and/or hand lever tilt device 184), the amount of beverage dispensed, the tilt of the vessel 112, and temperature at which the beverage is dispensed. The control module 174 can be configured to recommend the operating parameters to achieve the preferred pour (e.g., display them on the display 178) and/or automatically set the operating parameters (e.g., adjusts the vessel tilt device 182 and the hand lever tilt device 184) so that the system 100 automatically provides the preferred pour. In some embodiments, the control module 174 can be configured to not activate the switch 170, the hand lever tilt device 184, and/or the vessel tilt device 182 unless the operating parameters to achieve the preferred pour are set. For instance, the beverage may not be at the correct temperature to achieve the preferred pour, so the control module 174 may not allow for disbursement of the beverage until the correct temperature has been obtained. The recommended operating parameters and the actual operating parameters can be transmitted to the display 178 for viewing by the user.

As a non-limiting example, the preferred pour for a certain type of beer may be to dispense 20 oz. of beer to generate 14 oz. of beer and 2 oz. of head in the vessel 112. The control module 174 can then determine the flow rate and vessel tilt to achieve this preferred pour based on the vessel information, the type of beverage, the temperature of the beverage, etc., and cause the components of the system 100 to act so as to achieve the preferred pour.

The tilt of the vessel 112 is achieved via the vessel tilt device 182. FIG. 10 shows an exemplary vessel tilt device 182. As an example, the vessel tilt device 182 can be a cradle 192 supported by a motorized rotary unit 194 (e.g., a gimbal assembly) that can adjust for pitch, roll, and/or yaw. The vessel tilt device 182 can be attached to the housing 104 via the rotary unit 194. The cradle 192 can include a base 196 upon which the vessel 112 is rested upon so as to facilitate the vessel 112 being positioned underneath the tap head 116 (or the port 110 of the tap head 116). In some embodiments, the base 196 includes the antenna 186 (see FIG. 11). The cradle 192 can include an arm 198. The arm 198 can be in the form of a structure that grips, supports, or cradles the vessel 112. For instance, the arm 198 can include a rotation lever 200 extending from the rotary unit 194. When the rotary unit 194 is actuated, the rotation lever 200 is caused to move so as to pivot about the rotary unit 194. The rotation lever 200 can be a telescopic member (e.g., an inner tube or bar that slidably engages with an outer tube). This can facilitate adjusting the length of the rotation lever 200 so as to accommodate different vessel 112 lengths. A tensioner, interference fit, pin-and-detent mechanism, etc. can be used to secure the two telescopic members in a position relative to each other. The base 196 can extend laterally from the rotation lever 200 at or near the bottom end of the rotation lever 200 so as to form a level structure upon which the vessel 112 rests. The arm 198 can include a bracket 202 extending laterally from the rotation lever 200 at or near a mid-section of the rotation lever 200 so as to form a brace that contours to and supports the vessel 112. It is contemplated for the bracket 202 to have a curved shape that complements the curved shape of the vessel 112. The arm 198 can include a longitudinal support beam 204 extending upward from the distal end of the bracket 202. The longitudinal support beam 204 can be a telescopic member (e.g., an inner tube or bar that slidably engages with an outer tube). This can facilitate adjusting the length of the longitudinal support beam 204 so as to accommodate different vessel lengths 112. A tensioner, interference fit, pin-and-detent mechanism, etc. can be used to secure the two telescopic members in a position relative to each other. The arm 198 can include a latitudinal support beam 206 positioned at or near the distal end of the longitudinal support beam 204 and situated to be perpendicular to the longitudinal support beam 204. The latitudinal support beam 206 can include a pair of grippers 208 that are rigid but flexible so as to allow for an interference fit between the grippers 208 and the vessel 112. Each gripper 208 can be attached to respective ends of the latitudinal support beam 206. The longitudinal support beam 204 can be formed by two telescopic members (e.g., a first inner tube or first bar that slidably engages with an outer tube at the first end of the latitudinal support beam 206 and a second inner tube or second bar that slidably engages with the outer tube at the second end of the latitudinal support beam 206). This can facilitate adjusting the length of the latitudinal support beam 206 (e.g., the distance between each gripper 208) so as to accommodate different vessel 112 widths. A tensioner, interference fit, pin-and-detent mechanism, etc. can be used to secure the telescopic members in a position relative to each other. The adjustment of any of the rotation lever 200, a longitudinal support beam 204, and/or latitudinal support beam 206 can be done manually or automatically. For automatic adjustment, a motor and encoder can be used to make the adjustments based on command signals transmitted from the control module 174 and/or the computer device 176, which may be based on the marker information, account use information, personal ID information, and/or vessel information.

Figure 11:
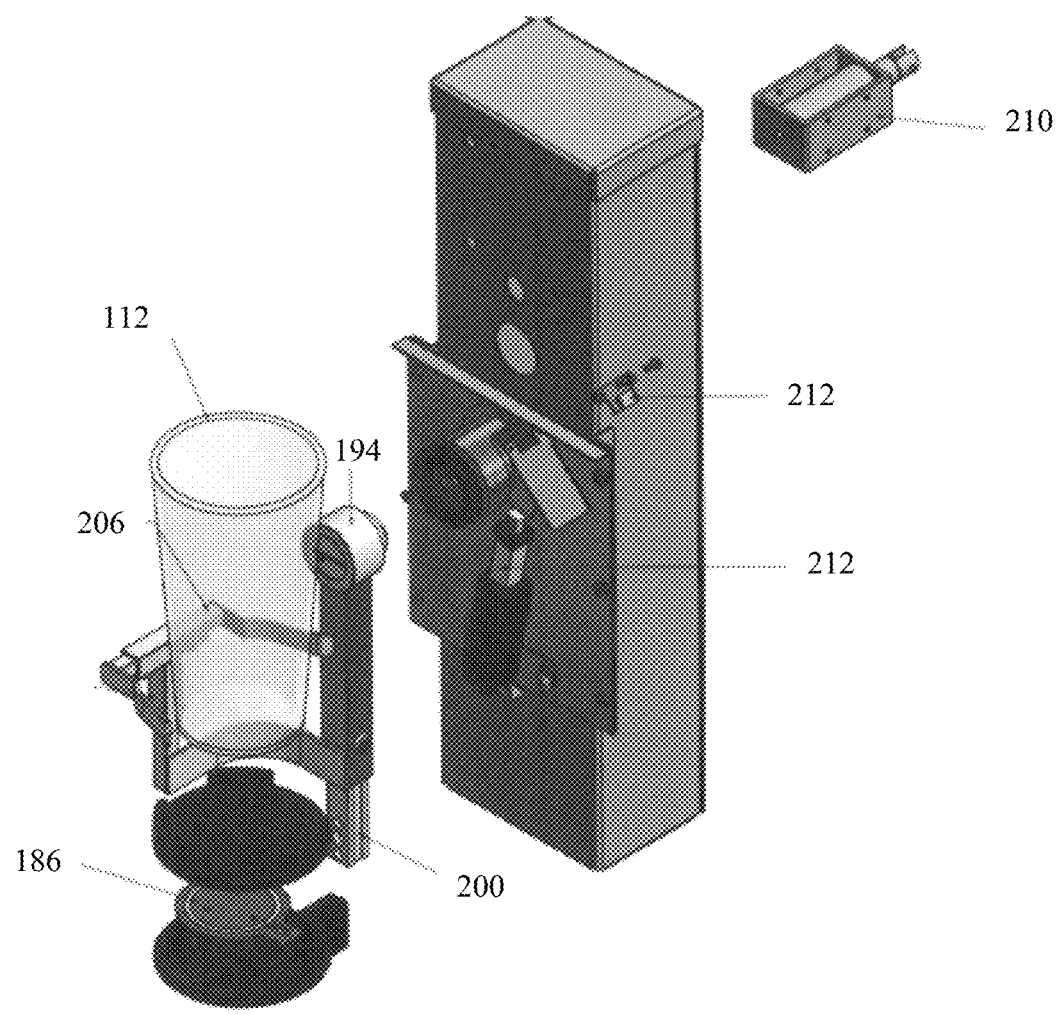

FIG. 11 is another view of an embodiment of the vessel tilt device 182. Some embodiments of the vessel tilt device 182 can include an activation device 210, and angle sensor 212, and an actuator 214. The activation device 210 can be in communication with the control module 174 and/or the computer device 176 to cause the actuator 214 to act upon the rotary unit 194. The angle sensor 212 can detect the relative angle of the rotation lever 200, base 196, or any other component of the tilt device 182 so as to determine the tilt angle of the that component (and therefore the tilt angle of the vessel 112 when the vessel 112 is placed within the cradle 192). The tilt angle is the angle relative to a longitudinal axis, the longitudinal axis being an axis that is straight up and down relative to a ground surface. Thus, as an example, a tilt angle of 12 degrees is 12 degrees relative to a geometric plane of the ground surface.

As noted above, the system 100 can track the temperature of the beverage, amount of beverage left in the beverage container 108, flow rates for the beverage being disbursed from the ports 110, depletion rates of beverage from the beverage container 108, etc. Tracking this information can be achieved via use of sensors (e.g., pressure sensors 218, flow meter sensors 220, temperature sensors 222, etc.—see FIG. 14) placed at various locations of the dispensing unit 102. These sensors can be in communication with the computer device 176 and/or control module 174.

As noted above, the computer device 176 can be used to establish a computer system network. This can include a communications network 188 of a plurality of dispensing systems 100, computer devices 176, etc. For instance, the system 100 can include a first dispensing system 100, a second dispensing system 100, a third dispensing system 100, etc. being managed by an administrator. Each of the first, second, and third system 100 can be located at different facilities to provide services (e.g., food, drink, entertainment, etc.) to users. The administrator can be in control of the control modules 174 for each system 100 and in control of a first computer device 176. The first computer device 176 can be a mainframe computer, a server, etc. Each user (or patron of services provided by the administrator) can be a part of the computer system network by using their electronic mobile device (e.g., smartphone) as a second computer device 176 to connect to the network. Thus, there can be a plurality of second computer devices 176. In addition, or in the alternative, to generating displays for the display 178, the system 100 can cause any of the first computer devices 176 and/or second computer devices 176 to display such information. For instance, the second computer devices 176 can download an application software (an app.) that would generate user interfaces to facilitate such display of information. It is contemplated for the transmission and display of information to the first computer device 176, second computer devices 176, and the display 178 to be controlled by the administrator via the first computer device 176. Thus, the information can be displayed in a discriminatory manner.

In some embodiments, an administrator can also use an electronic mobile device as a first computer device 176. The first computer device 176 that is an electronic mobile device can download an app. that would generate user interfaces to facilitate command and control of various aspects of the system 100.

Figure 14:
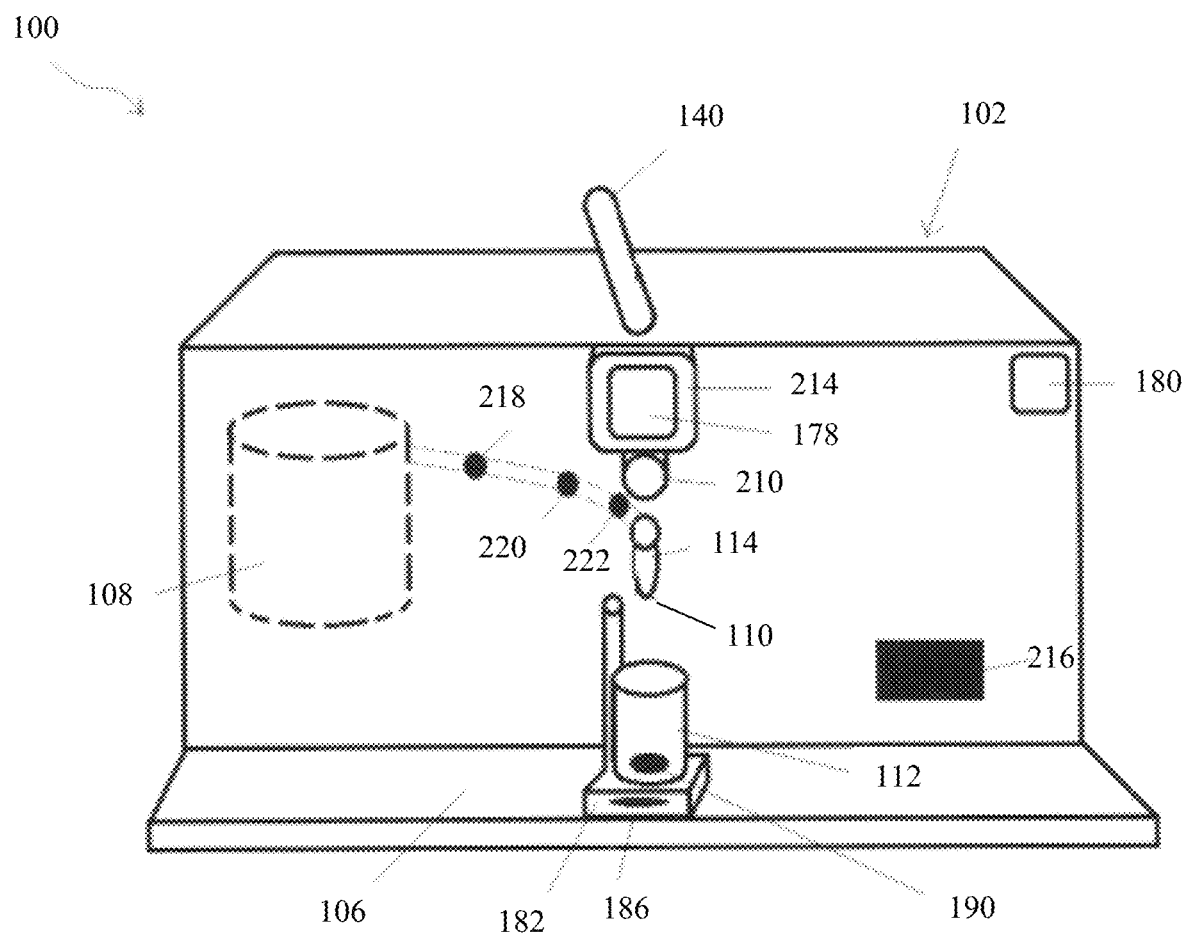
FIGS. 14-15 show another embodiment of the beverage dispensing system that includes an input/output controller.
Figure 15:
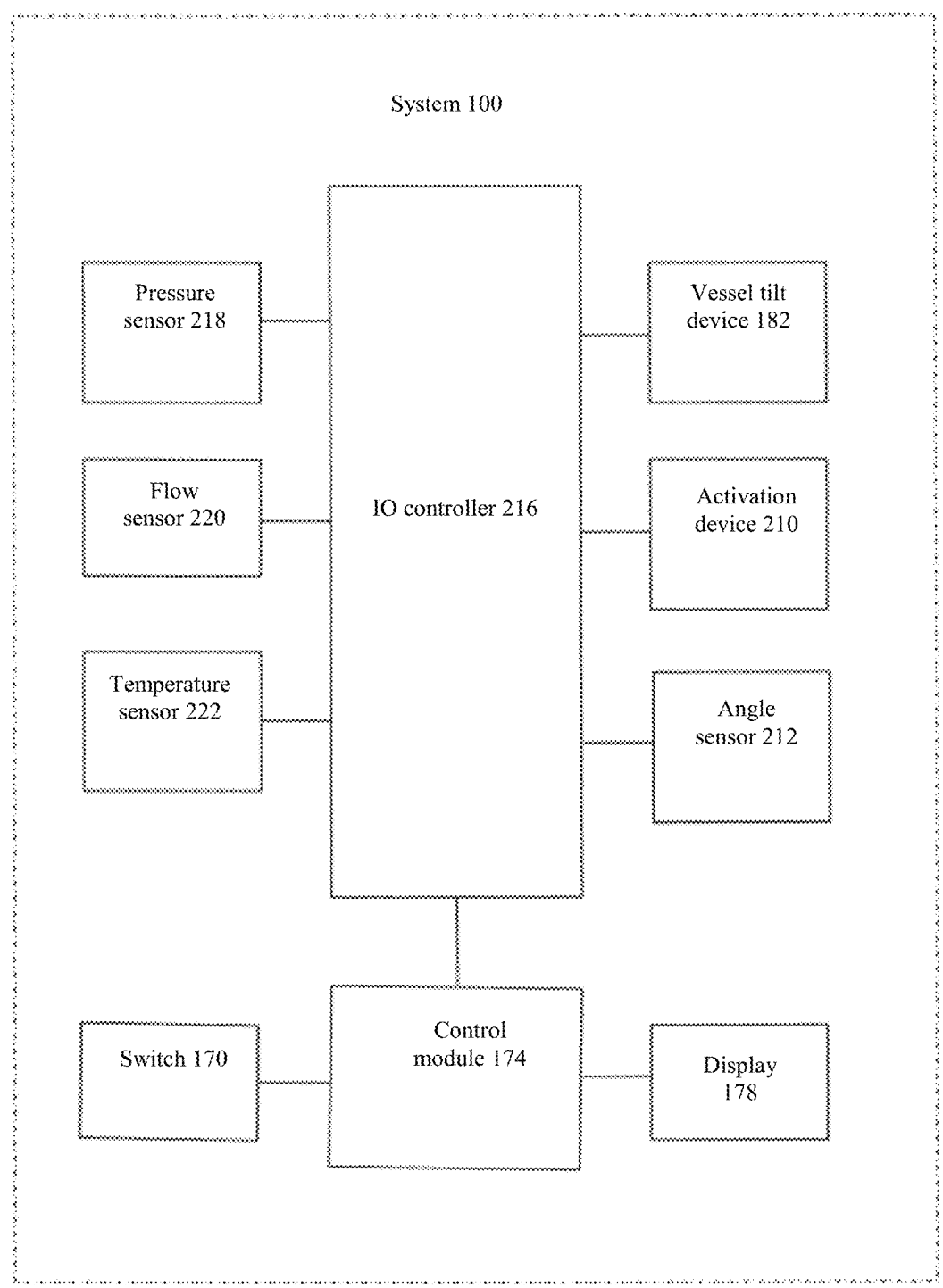

FIGS. 14-15 show another embodiment of the beverage dispensing system 100 that includes an input/output ("IO") controller 216. The IO controller 216 can be an integrated circuit that coordinates command and control of the vessel tilt device 182, activation device 210, display 178, switch 170, and/or control module 174, as well as data acquisitioning from any one or combination of the sensors 212, 218, 220, 222. For instance, the IO controller 216 can acquisition data from the angle sensor 212, the pressure sensor 218, the flow meter sensor 220, and/or the temperature sensor 222, and provide command signals to the vessel tilt device 182, activation device 210, display 178, switch 170, and/or control module 174 based on the sensor data. In the embodiment shown, sensors 218, 220, 222 are positioned within the hoses, pumps, etc. that are used to facilitate flow of beverage from the beverage container 108, through a port 110, and to the vessel 112.

Figure 16:
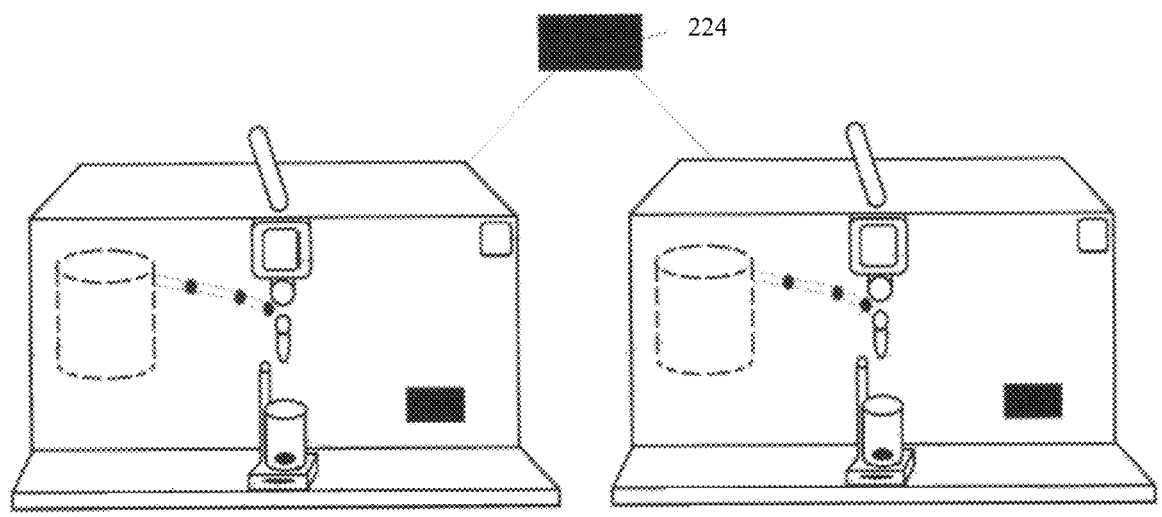
FIGS. 16-18 show another embodiment of the beverage dispensing system that includes a master control box configured to control one or more dispensing units.
Figure 17:
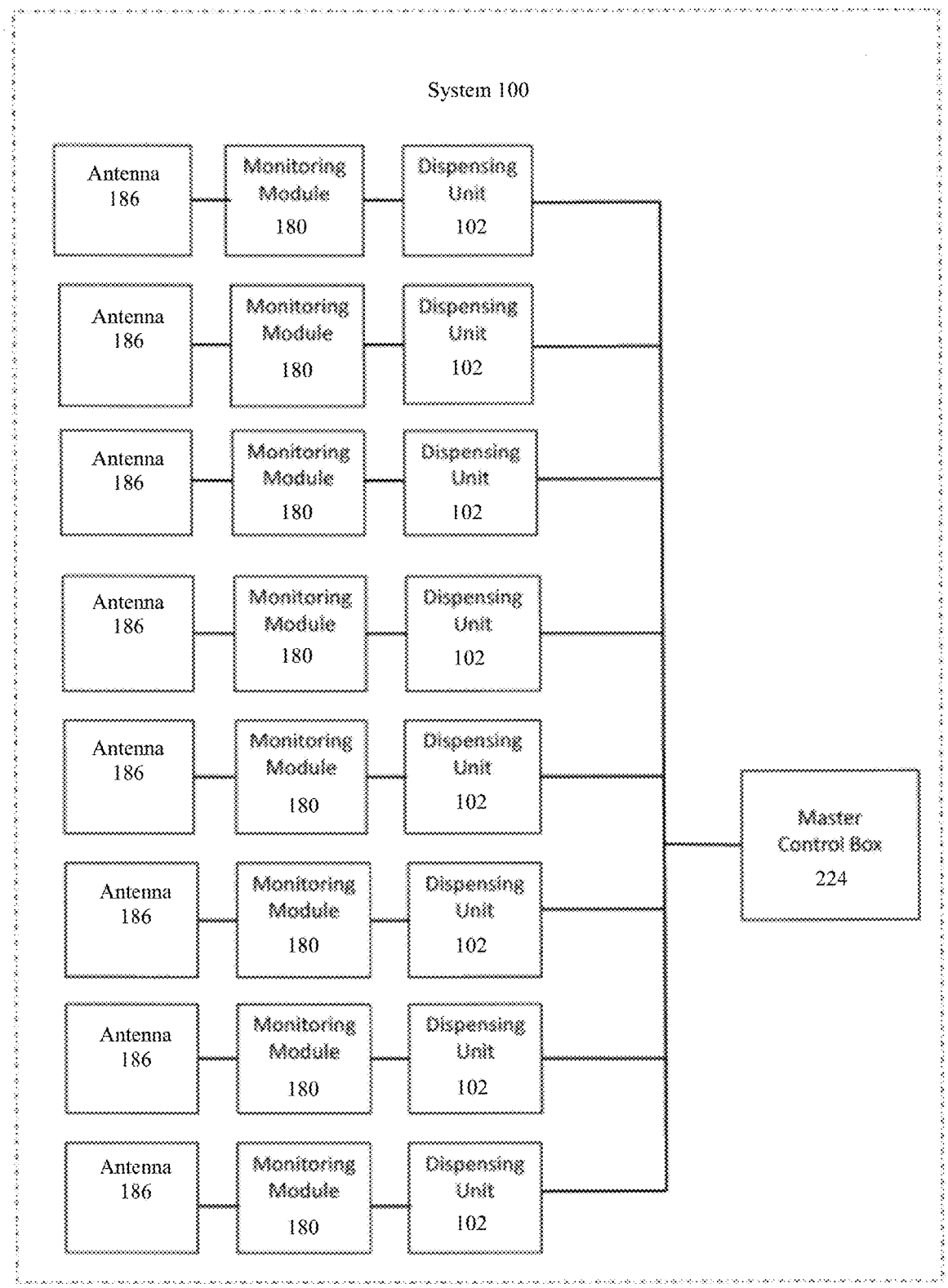
Figure 18:
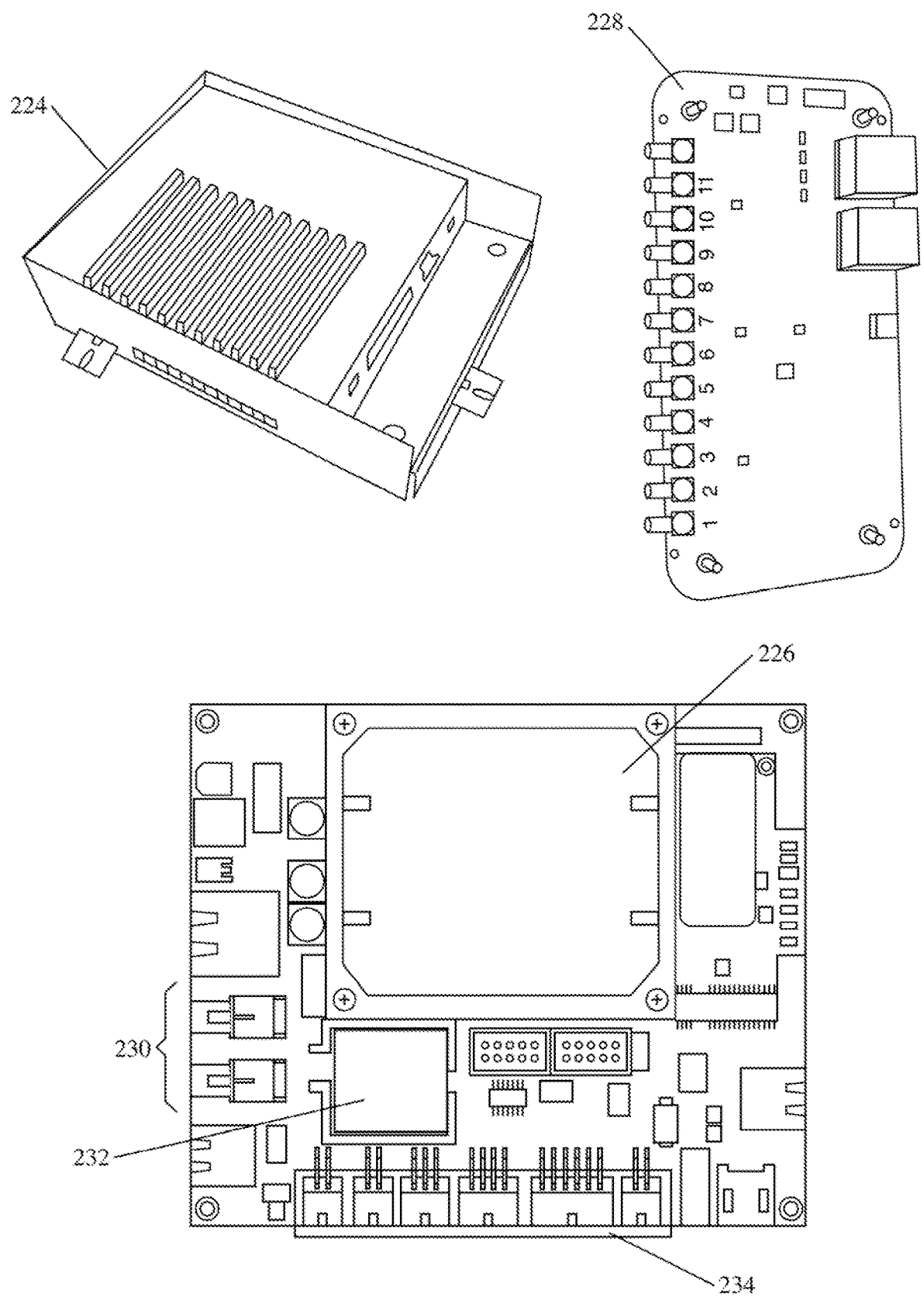

FIGS. 16-18 show another embodiment of the beverage dispensing system 100 that includes a master control box 224 configured to control one or more dispensing units 102. The master control box 224 can include a processor 226, a multiplexer 228, RFID connectors 230, a RFID reader 232, and control connections 234. The master control box 224 can be the computer device 176 or be in communication with the computer device 176. The multiplexer 228 can select between input signals being transmitted to and from the dispensing units 102 so as to coordinate concerted operation of more than one dispensing unit 102. For instance, the multiplexer 224 can facilitate several signals coming from the computer device 176 being shared by the several dispensing units 102. The RFID reader 232 can be in communication with the multiplexer 228, and the multiplexer 228 can be in communication with the antenna 186. In a system design that has a single dispensing unit 102, the multiplexer 228 can be omitted. In such a system, the RFID reader 232 would be in direct communication with the antenna 186 to read the marker 190.

It should be understood that modifications to the embodiments disclosed herein is made to meet a particular set of design criteria. For instance, the number of dispensing units 102, taps 114, tap heads 116, tap dispensers 118, control modules 174, computer devices 176, hand levers 140, hand lever tilt devices 184, vessel tilt devices 182, identification monitoring modules 180, switches 170, displays 178, readers 186, markers 190, and other components can be any suitable number of each to meet a particular objective. The particular configuration of type of such elements can also be adjusted to meet a particular set of design criteria. Therefore, while certain exemplary embodiments of the system and methods of making and using the same have been discussed and illustrated herein, it is to be distinctly understood that the invention is not limited thereto but may be otherwise variously embodied and practiced within the scope of the following claims.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A switching apparatus, comprising:
a magnetic field generator;
a slide having a top surface and a bottom surface, the slide having a slide track formed in or on the bottom surface, the slide having a first opening formed in the top surface and a second opening formed in the bottom surface, the first opening and the second opening subtending each other so as to form a longitudinal axis;
a rod configured to slide along the slide track, the rod further configured to move perpendicularly to the slide track when the rod is slid to be positioned at the longitudinal axis, wherein:
the rod comprises magnetic material;
the rod being positioned at the longitudinal axis is an alignment position;
the rod not being positioned at the longitudinal axis is a mis-alignment position;

a spring element configured to bias the rod to the mis-alignment position;
wherein the magnetic field generator is configured to generate a magnetic field to cause the rod to slide towards the alignment position;
wherein:
in the alignment position, the rod serves as a cantilever to facilitate mechanical engagement and transfer of motion between a first ancillary element configured to insert through the first opening and a second ancillary element configured to insert through the second opening; and
in the mis-alignment position, the first ancillary element does not mechanically engage the second ancillary element.

2. The switching apparatus recited in claim 1, further comprising a control module configured to at least one of:
supply electrical power to operate the magnetic field generator; and
transmit control signals to control operation of the magnetic field generator.

3. The switching apparatus recited in claim 1, further comprising a rechargeable battery unit.

4. A tap head, comprising:
a hollow member having a tap head housing first end, a tap head housing second end, a tap head housing third end, and a tap head housing fourth end, wherein:
the tap head housing first end subtends the tap head housing second end so as to form a tap head longitudinal axis running from the tap head housing first end to the tap head housing second end;
the tap head housing third end subtends the tap head housing fourth end so as to form a tap head latitudinal axis running from the tap head housing third end to the tap head housing fourth end;
the tap head housing first end has a hand lever aperture configured to receive a portion of a hand lever; and
the tap head housing second end has a stem aperture configured to receive a portion of a stem;
a magnetic field generator located at or near the tap head housing fourth end;
a slide located at or near the tap head housing third end, wherein:
the slide has a top surface and a bottom surface;
the slide has a slide track formed in or on the bottom surface, the slide track being along the tap head latitudinal axis; and
the slide has a first opening formed in the top surface and a second opening formed in the bottom surface, the first opening being in-line with the hand lever aperture and the second opening being in-line with the stem aperture;
a rod configured to slide along the slide track, the rod further configured to move along the tap head longitudinal axis when the rod is slid to be aligned with the hand lever aperture and the stem aperture, wherein:
the rod comprises magnetic material;
the rod being aligned with the hand lever aperture and the stem aperture forms an alignment position; and
the rod not being aligned with the hand lever aperture and the stem aperture forms a mis-alignment position;
a spring element configured to bias the rod to the mis-alignment position;
wherein the magnetic field generator is configured to generate a magnetic field to cause the rod to slide towards the alignment position;
wherein:
in the alignment position, the rod serves as a cantilever to facilitate mechanical engagement and transfer of motion between the hand lever and the stem; and
in the mis-alignment position, the hand lever does not mechanically engage the stem.

5. The tap head recited in claim 4, wherein the tap head is configured to removably connect to a tap dispenser, the tap dispenser comprising the stem.

6. A tap, comprising:
a tap dispenser, comprising:
connection lines to facilitate fluid connection from a beverage container to a port of a dispensing unit; and
a stem configured to facilitate actuation of a disc for selective obstruction of the port; and
the tap head recited in claim 4.

7. The tap head recited in claim 5, further comprising a control module configured to at least one of:
supply electrical power to operate the magnetic field generator; and
transmit control signals to control operation of the magnetic field generator.

8. A beverage dispensing system, comprising:
a dispensing unit comprising a tap dispenser, the dispensing unit configured to disburse beverage from a beverage container via operation of the tap dispenser, the tap dispenser comprising:
connection lines to facilitate fluid connection from the beverage container to a port of the dispensing unit; and
a stem configured to facilitate actuation of a disc for selective obstruction of the port;
a tap head configured to attach to the tap dispenser and receive a portion of the stem and receive a portion of the hand lever, the tap head comprising a switching apparatus configured to cause a rod to facilitate mechanical engagement and transfer of motion between the hand lever and the stem when the switching apparatus is activated, wherein:
when the switching apparatus is activated, actuation of the hand lever acts upon the stem; and
when the switching apparatus is not activated, actuation of the hand lever does not act upon the stem.

9. The beverage dispensing system recited in claim 8, further comprising a control module configured to at least one of:
supply electrical power to operate the switching apparatus; and
transmit control signals to control operation of the switching apparatus.

10. The beverage dispensing system recited in claim 8, further comprising a reader configured to acquisition marker information from a marker.

11. The beverage dispensing system recited in claim 10, further comprising the marker, the marker being associated with a vessel.

12. The beverage dispensing system recited in claim 11, wherein the marker information comprises personal ID information, account use information, and/or vessel information.

13. The beverage dispensing system recited in claim 8, further comprising a hand lever tilt device configured to automatically actuate the hand lever.

14. The beverage dispensing system recited in claim 8, further comprising a vessel tilt device configured to support and tilt a vessel into which beverage is being disbursed from the port.

15. The beverage dispensing system recited in claim 12, further comprising a display configured to display at least some of the marker information.

16. The beverage dispensing system recited in claim 15, wherein the display is configured to display instructional information, tutorial information, advertising content, and/or marketing content.

17. The beverage dispensing system recited in claim 8, further comprising an identification monitoring module configured to scan for, acquisition, and/or receive information to confirm the identity of a user.

18. The beverage dispensing system recited in claim 8, further comprising:
   a control module configured to supply electrical power to operate the switching apparatus and/or transmit control signals to control operation of the switching apparatus;
   a marker associated with a vessel, the marker being encoded with marker information comprising personal ID information, account use information, and/or vessel information;
   a reader configured to acquisition marker information from the marker;
   a hand lever tilt device configured to automatically actuate the hand lever;
   a vessel tilt device configured to support and tilt the vessel into which beverage is being disbursed from the port;
   a display configured to display at least some of the marker information, instructional information, tutorial information, advertising content, and/or marketing content;
   an identification monitoring module configured to scan for, acquisition, and/or receive information to confirm the identity of a user; and
   a computer device configured to establish a communications network.

19. The beverage dispensing system recited in claim 18, wherein the beverage dispensing system is configured to adjust operating parameters of beverage flow rate, amount of beverage disbursed, and tilt of the vessel.

20. The beverage dispensing system recited in claim 19, wherein the beverage dispensing system is configured to adjust the operating parameters to achieve a preferred pour, the preferred pour being a beverage flow rate, a beverage amount, and a vessel tilt that maximizes fluid dynamics of disbursement to generate a desired taste and/or visual effect.

21. The beverage dispensing system recited in claim 8, further comprising:
   a control module configured to supply electrical power to operate the switching apparatus and/or transmit control signals to control operation of the switching apparatus;
   a marker associated with a vessel, the marker being encoded with marker information comprising personal ID information, account use information, and/or vessel information;
   a reader configured to acquisition marker information from the marker;
   a hand lever tilt device configured to automatically actuate the hand lever;
   a vessel tilt device configured to support and tilt the vessel into which beverage is being disbursed from the port, wherein the vessel tilt device includes an activation device and an angle sensor;
   a display configured to display at least some of the marker information, instructional information, tutorial information, advertising content, and/or marketing content;
   an identification monitoring module configured to scan for, acquisition, and/or receive information to confirm the identity of a user;
   a pressure sensor, a flow meter sensor, and/or a temperature sensor;
   an input/output controller configured to coordinate command and control of the vessel tilt device, the activation device, the display, the switching apparatus, and the control module, as well as data acquisitioning from the angle sensor, the pressure sensor, the flow meter sensor, and/or the temperature sensor.

22. The beverage dispensing system recited in claim 8, further comprising:
   a plurality of dispensing units; and
   a master control box configured to control one or more dispensing units.

23. A tap, comprising:
   a tap dispenser, comprising:
      connection lines to facilitate fluid connection from a beverage container to a port of a dispensing unit; and
      a stem configured to facilitate actuation of a disc for selective obstruction of the port; and
   a tap head comprising:
      a push-button configured to activate a gear assembly, the gear assembly in mechanical connection with the stem;
      a switch configured to selectively make an electrical connection facilitating activation of the gear assembly when the push-button is activated; and
      wherein the switch makes the electrical connection based on marker information transmitted to the switch from a reader.

* * * * *